(12) United States Patent
Hayakawa et al.

(10) Patent No.: US 10,262,690 B2
(45) Date of Patent: Apr. 16, 2019

(54) SIGNAL PROCESSING DEVICE, SIGNAL PROCESSING SYSTEM, SIGNAL PROCESSING METHOD, AND PROGRAM

(71) Applicant: Sony Semiconductor Solutions Corporation, Kanagawa (JP)

(72) Inventors: Tomonobu Hayakawa, Kanagawa (JP); Shinji Negishi, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/554,143

(22) PCT Filed: Jan. 12, 2016

(86) PCT No.: PCT/JP2016/050712
§ 371 (c)(1),
(2) Date: Aug. 28, 2017

(87) PCT Pub. No.: WO2016/139971
PCT Pub. Date: Sep. 9, 2016

(65) Prior Publication Data
US 2018/0040348 A1 Feb. 8, 2018

(30) Foreign Application Priority Data
Mar. 3, 2015 (JP) ................................ 2015-041003

(51) Int. Cl.
*G11B 27/00* (2006.01)
*H04N 5/93* (2006.01)
(Continued)

(52) U.S. Cl.
CPC ............ *G11B 27/005* (2013.01); *G06F 3/165* (2013.01); *G10L 21/0356* (2013.01);
(Continued)

(58) Field of Classification Search
USPC ................ 386/285, 278, 280, 287, 232, 200
See application file for complete search history.

(56) References Cited

U.S. PATENT DOCUMENTS 5,859,950 A * 1/1999 Iwamoto .......... G11B 20/00007
386/255
8,849,090 B2 * 9/2014 Kosakai ................. H04N 5/232
386/219
(Continued)

FOREIGN PATENT DOCUMENTS

JP 2010-178124 A 8/2010
JP 2011-55386 A 3/2011
(Continued)

OTHER PUBLICATIONS

Audacity Quick Guide, Dec. 2007.*
AAC Transport Formats, Jul. 2014.*

*Primary Examiner* — Daquan Zhao
(74) *Attorney, Agent, or Firm* — Michael Best & Friedrich LLP

(57) ABSTRACT

Reduction in reproduction quality is suppressed in an imaging device that images a sound and a moving image. A frame rate converter converts a frame rate of a frame captured outside a predetermined period among a plurality of frames captured at a predetermined frame rate to a low frame rate lower than the predetermined frame rate. A duplication unit duplicates an original sound signal recorded over the predetermined period to generate a plurality of duplicated sound signals each of which is identical to the original sound signal. The audio signal processing unit performs different signal processing on each of the plurality of duplicated sound signals.

14 Claims, 25 Drawing Sheets

(51) Int. Cl.

| | | |
|---|---|---|
| *G06F 3/16* | (2006.01) | |
| *G10L 21/043* | (2013.01) | |
| *G11B 27/031* | (2006.01) | |
| *H04N 5/073* | (2006.01) | |
| *H04N 7/01* | (2006.01) | |
| *H04N 9/802* | (2006.01) | |
| *H04N 9/87* | (2006.01) | |
| *H04R 3/04* | (2006.01) | |
| *G10L 21/055* | (2013.01) | |
| *G10L 21/0356* | (2013.01) | |
| *H04N 5/77* | (2006.01) | |
| *H04N 5/783* | (2006.01) | |
| *H04N 9/82* | (2006.01) | |
| *H04N 5/765* | (2006.01) | |
| *H04N 5/14* | (2006.01) | |

(52) U.S. Cl.
CPC .......... *G10L 21/043* (2013.01); *G10L 21/055* (2013.01); *G11B 27/031* (2013.01); *H04N 5/0736* (2013.01); *H04N 5/772* (2013.01); *H04N 5/783* (2013.01); *H04N 7/0127* (2013.01); *H04N 9/802* (2013.01); *H04N 9/8205* (2013.01); *H04N 9/87* (2013.01); *H04R 3/04* (2013.01); *H04N 5/147* (2013.01)

(56) References Cited

U.S. PATENT DOCUMENTS

| | | | |
|---|---|---|---|
| 2007/0032894 A1* | 2/2007 | Uenishi | G11B 27/005 700/94 |
| 2008/0266457 A1* | 10/2008 | Sasakura | G11B 27/28 348/572 |
| 2016/0012848 A1* | 1/2016 | Ryckman | G06Q 30/06 700/94 |

FOREIGN PATENT DOCUMENTS

| | | |
|---|---|---|
| JP | 2011-139306 A | 7/2011 |
| JP | 2013-168710 A | 8/2013 |
| WO | 2008/050806 A1 | 5/2008 |

* cited by examiner

FIG. 17

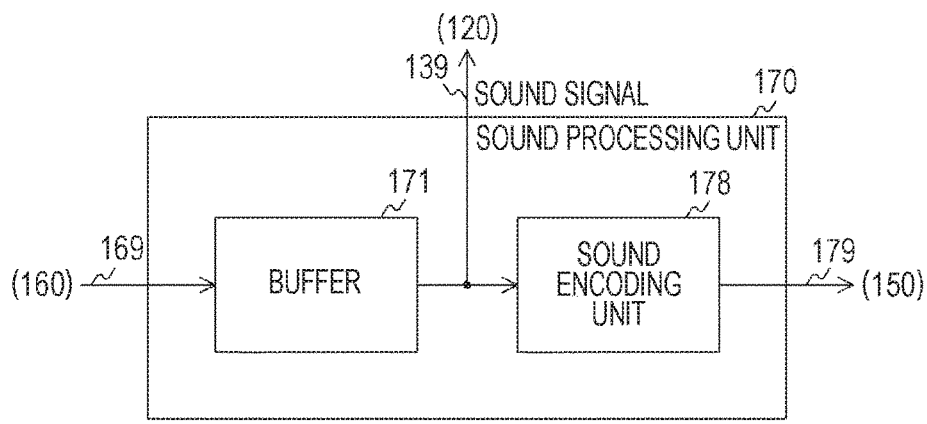

FIG. 18

```
Syntax                                              No. of bits   Mnemonic
raw_data_block()
{
    while((id=id_syn_ele) !=ID_END){                 3            uimsbf
        switch(id){
            case ID_SCE: single_channel_element();
                break;
            case ID_CPE: channel_pair_element();
                break;
            case ID_CCE: coupling_channel_element();
                break;
            case ID_LFE: lfe_channel_element();      511
                break;
            case ID_DSE: data_stream_element();
                break;
            case ID_PCE: program_config_element();
                break;
            case ID_FIL: fill_element();
        }
    }
    byte_alignment();
}
```

| SOUND REPRODUCTION TIME | NUMBER OF TIMES OF DUPLICATION | GAIN CHANGE AMOUNT |
|---|---|---|
| Ts1, Ts2··· | 10 | −10dB |

| Moov | | | | | | * | 13. 2. 3. 1 | container for all the meta-data |
|---|---|---|---|---|---|---|---|---|
| | mvhd | | | | | * | 13. 2. 3. 3 | movie header, overall declarations |
| | iods | | | | | * | 13. 2. 3. 4 | object descriptor |
| | trak | | | | | * | 13. 2. 3. 4. 2 | container for an individual track or stream |
| | | tkhd | | | | * | 13. 2. 3. 6 | track header, overall information about the track |
| | | tref | | | | | 13. 2. 3. 7 | track reference container |
| | | edts | | | | | 13. 2. 3. 25 | edit list container |
| | | | elst | | | | 13. 2. 3. 26 | an edit list |
| | | mdia | | | | * | 13. 2. 3. 8 | container for the media information in a track |
| | | | mdhd | | | * | 13. 2. 3. 9 | media header, overall information about the media |
| | | | hdlr | | | | 13. 2. 3. 10 | handler at this level, the media (handler) type |
| | | | minf | | | * | 13. 2. 3. 11 | media information container |
| | | | | vmhd | | | 13. 2. 3. 12. 1 | video media header, overall information (video track only) |
| | | | | smhd | | | 13. 2. 3. 12. 2 | sound media header, overall information (sound track only) |
| | | | | hmhd | | | 13. 2. 3. 12. 3 | hint media header, overall information (hint track only) |
| | | | | <mpeg> | | | 13. 2. 3. 12. 4 | mpeg stream headers |
| | | | | dinf | | * | 13. 2. 3. 13 | data information atom, container |
| | | | | | dref | * | 13. 2. 3. 14 | data reference atom, declares source(s) of media in track |
| | | | | stbl | | * | 13. 2. 3. 15 | sample table atom, container for the time/space map |
| | | | | | stts | * | 13. 2. 3. 16. 1 | (decoding) time-to-sample |
| ⋮ | ⋮ | ⋮ | ⋮ | ⋮ | ⋮ | ⋮ | ⋮ | ⋮ |
| mdat | | | | | | | 13. 2. 3. 2 | Media data container |
| free | | | | | | | 13. 2. 3. 24 | free space |
| skip | | | | | | | 13. 2. 3. 24 | free space |
| udta | | | | | | | 13. 2. 3. 27 | user-data, copyright etc. |

| Box Types | | | | | | | * | Reference | Description |
|---|---|---|---|---|---|---|---|---|---|
| ftyp | | | | | | | * | | file type and compatibility |
| uuid | | | | | | | * | 2. 4. 18. 1 | private extension ('PROF'), file profile |
| moov | | | | | | | * | | container for all the movie resources |
| | mvhd | | | | | | * | | movie header, overall declarations |
| | iods | | | | | | | * 3 | container for an initial object descriptor |
| | trak | | | | | | * | | container for an individual track or stream |
| | | tkhd | | | | | * | | track header, overall information about the track |
| | | tref | | | | | | | track reference container |
| | | | sync | | | | | | synchronization indication |
| | | | mpod | | | | | | OD track indication |
| | | edts | | | | | * | | edit list container |
| | | | elst | | | | * | | an edit list |
| | | mdia | | | | | * | | container for the media information in a track |
| | | | mdhd | | | | * | | media header, overall information about the media |
| | | | hdlr | | | | * | | media header, the media (handler) type |
| | | | minf | | | | * | | media information container |
| | | | | vmhd | | | * 2 | | video media header, (video track only) |
| | | | | smhd | | | * 2 | | sound media header, (audio track only) |
| | | | | nmhd | | | * 2 | | null media header, (some tracks only) |
| | | | | dinf | | | * | | data information container |
| | | | | | dref | | * | | data reference, declares source(s) of media in track |
| | | | | | | url | * | | URL reference entry |
| | | | | stbl | | | * | | sample table, container for the time/space map |
| : | : | : | : | : | : | : | : | : | :        531 |
| | | uuid | | | | | * | 2. 4. 18. 2 | private extension ('USMT'); user specific metadata |
| | | | MTDF | | | | | 2. 4. 18. 3 | meta type definition list |
| | | | MTDT | | | | * | 2. 4. 18. 4 | metadata list |

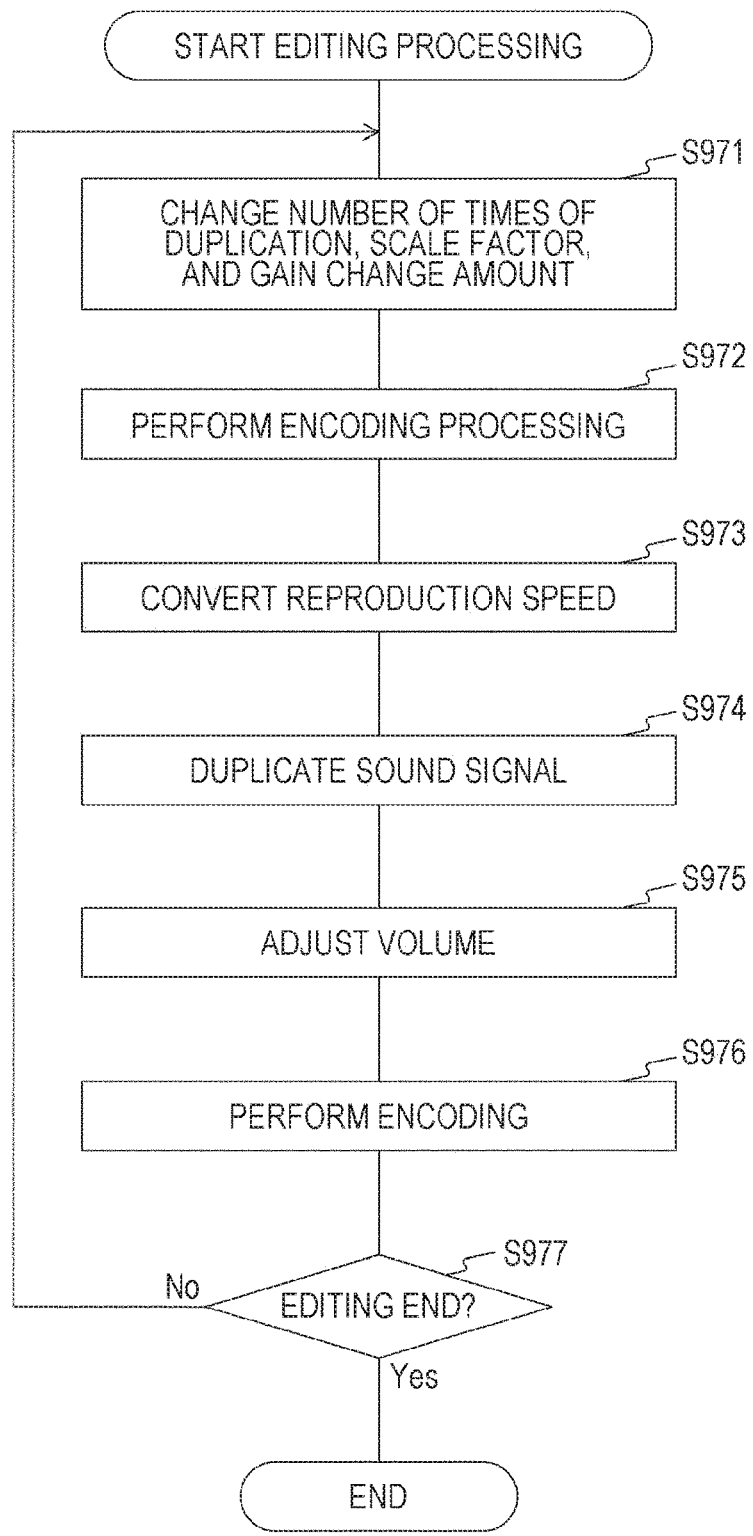

SIGNAL PROCESSING DEVICE, SIGNAL PROCESSING SYSTEM, SIGNAL PROCESSING METHOD, AND PROGRAM

TECHNICAL FIELD

The present technology relates to a signal processing device, a signal processing system, a signal processing method, and a program. More specifically, the present invention relates to a signal processing device, a signal processing system, a signal processing method that process a sound signal, and a program for causing a computer to execute the method.

BACKGROUND ART

Conventionally, in a case of imaging an object moving at high speed, an imaging device that captures a moving image at a frame rate higher than the frame rate at the time of reproduction is used. A smooth slow motion image can be obtained by reproducing this moving image at a lower frame rate than at the time of visual recording. For example, in a case where a moving image captured at a high frame rate of 600 hertz (Hz) is reproduced at a low frame rate of 60 hertz (Hz), the reproduction time is extended to 10 times the visual recording time, and the motion speed of the object in the reproduced moving image decreases to ¹⁄₁₀. In the case of recording sound during such high-speed shooting, an imaging device which delays a sound reproduction speed in accordance with a decrease in frame rate has been proposed (for example, see Patent Document 1). In this imaging device, for example, in a case of reproducing a moving image at a frame rate of ¹⁄₁₀ relative to the time of visual recording, the reproduction speed is reduced to ¹⁄₁₀ to reproduce the sound.

CITATION LIST

Patent Document

Patent Document 1: Japanese Patent Application Laid-Open No. 2010-178124

SUMMARY OF THE INVENTION

Problems to be Solved by the Invention

However, with the above-described conventional technique, as the sound reproduction speed is delayed, the reproduction quality of the sound may be deteriorated, thereby making it difficult to hear. Also, in a case of extending the reproduction time of the moving image but not changing the reproduction speed of the sound, the silent time will be longer. For example, in a case of extending the reproduction time of a moving image taken at a high speed for 1 second to 10 seconds and performing reproduction from the beginning of high-speed shooting without extending the sound recorded during the high speed shooting, silence time continues for 9 seconds As a result, the reproduction quality may be deteriorated. Thus, there is a problem that it is difficult to suppress deterioration of reproduction quality.

The present technology has been created in view of such a situation, and it is an object of the present technology to suppress deterioration of reproduction quality in an imaging device that captures a sound and moving image.

Solutions to Problems

The present technology has been made in order to solve the above-mentioned problems, and a first aspect of thereof is a signal processing device, a signal processing method in the signal processing device, and a program causing a computer to perform the method, the signal processing device including: a frame rate converter that converts a frame rate of a frame captured outside a predetermined period among a plurality of frames captured at a predetermined frame rate to a low frame rate lower than the predetermined frame rate; a duplication unit that duplicates an original sound signal recorded over the predetermined period to generate a plurality of duplicated sound signals each of which is identical to the original sound signal; and a sound signal processing unit that executes different signal processing for each of the plurality of duplicated sound signals. Accordingly, different signal processing is performed on each of the plurality of duplicated sound signals.

Further, in the first aspect, the sound signal processing unit may perform processing of adjusting a volume level of each of the plurality of duplicated sound signals by mutually different gains, as the signal processing. Accordingly, the volume level of each of the duplicated sound signals is adjusted by different gains.

Furthermore, in the first aspect, the sound signal processing unit may perform processing of changing frequency characteristics of the plurality of duplicated sound signals to mutually different characteristics, as the signal processing. Accordingly, the frequency characteristic of each of the duplicate sound signals is changed to a different characteristic.

Further, in the first aspect, the signal processing device may further include a reproduction speed converter that changes the reproduction speed of the original sound signal and supplies the original sound signal to the duplication unit. Accordingly, the reproduction speed of the original sound signal is changed.

In addition, in the first aspect, the signal processing device may further include a reproduction time setting unit that sets a start timing of a silent period to a reproduction start time of the plurality of duplicated sound signals in a case where there is a silent period in which the volume level is less than a predetermined level immediately before a start timing of the predetermined period. Accordingly, the duplicated sound signal is reproduced from the start timing of the silent period.

Also, in the first aspect, in a case where there is a silent period in which a volume level is less than a predetermined level immediately after a start timing of the predetermined period, the sound signal recorded over a period excluding the silent period from the predetermined period is duplicated, and in a case where there is no silent period, the original sound signal recorded over the predetermined period may be duplicated. Accordingly, the sound signal recorded over a period excluding the silent period is duplicated.

Further, in the first aspect, the signal processing device may further include a scene change detector that detects a scene change timing at which a scene has changed from a plurality of frames captured at a predetermined frame rate and sets a period including the scene change timing as the predetermined period. Accordingly, the frame rate of the frame captured outside the period including the scene change timing is converted into a low frame rate.

Furthermore, a second aspect of the present technology is a signal processing system including: a signal processing device that converts a frame rate of a frame captured outside a predetermined period among a plurality of frames captured at a predetermined frame rate to a low frame rate lower than the predetermined frame rate, and generates metadata including setting information indicating the number of times of duplication for duplicating an original sound signal recorded over the predetermined period and mutually different signal processing to be executed for each of the plurality of duplicated sound signals generated by duplicating the original sound signal; and a reproduction device that generates the plurality of duplicated sound signals by duplicating the original sound signal on the basis of the number of times of duplication indicated by the setting information, performs the signal processing indicated by the setting information on each of the plurality of duplicated sound signals, and reproduces the plurality of sound signals and the plurality of frames. Accordingly, different signal processing is performed on each of the plurality of duplicated sound signals.

Further, in the second aspect, the metadata format is MPEG4-AAC, and the signal processing device may record the setting information in a data stream element (DSE) region of the metadata. This brings about an effect that duplication and signal processing are executed on the basis of the DES region setting information in MPEG4-AAC.

Furthermore, in the second aspect, the metadata format is MPEG4-system, and the signal processing device may record the setting information in a udta region of the metadata. This brings about an effect that duplication and signal processing are executed on the basis of the setting information of the udta region in MPEG4-system.

Furthermore, in the second aspect, the metadata format is a home and mobile multimedia platform (HMMP), and the signal processing device may record the setting information in a uuid region of the metadata. This brings about an effect that duplication and signal processing are executed on the basis of the setting information of a uuid region in the HMMP.

Furthermore, a second aspect of the present technology is a signal processing system including: a signal processing device that converts a frame rate of a frame captured outside a predetermined period among a plurality of frames captured at a predetermined frame rate to a low frame rate lower than the predetermined frame rate, and generates metadata including setting information indicating the number of times of duplication for duplicating an original sound signal recorded over the predetermined period and mutually different signal processing to be executed for each of the plurality of duplicated sound signals generated by duplicating the original sound signal; and an editing device that changes the setting information, generates the plurality of duplicated sound signals by duplicating the original sound signal on the basis of the number of times of duplication indicated by the changed setting information, and performs the signal processing indicated by the setting information on each of the plurality of duplicated sound signals. Accordingly, different signal processing is performed on each of the plurality of duplicated sound signals.

Effects of the Invention

According to the embodiments of the present technology, it is possible to achieve an excellent effect that degradation of reproduction quality can be suppressed in an imaging device that captures a sound and a moving image. Note that the effects described herein are not necessarily limited, and any of the effects described in the present disclosure may be applied.

BRIEF DESCRIPTION OF THE DRAWINGS

FIG. 17 is a block diagram illustrating a configuration example of a sound processing unit in the second embodiment.

FIG. 18 is a view illustrating an example of a field to be set in a case of using MPEG 4-AAC in the second embodiment.

FIG. 19 is a view illustrating an example of a detailed setting data in the second embodiment.

FIG. 20 is a view illustrating an example of a field to be set in a case of using MPEG 4-system in the second embodiment.

FIG. 21 is a view illustrating an example of a field to be set in a case of using a HMMP file format in the second embodiment.

FIG. 26 is a flowchart illustrating an example of editing processing in the third embodiment.

MODE FOR CARRYING OUT THE INVENTION

Hereinafter, a mode for implementing the present technology (hereinafter referred to as an embodiment) will be described. The description will be given in the following order.

1. First Embodiment (example in which a sound is duplicated and different signal processing is performed for each sound)
2. Second embodiment (example in which a sound is duplicated on the basis of metadata and different signal processing is performed for each sound)
3. Third embodiment (example in which metadata is edited, a sound is duplicated, and different signal processing is performed for each sound)

1. First Embodiment

Configuration Example of Imaging Device

Figure 1:
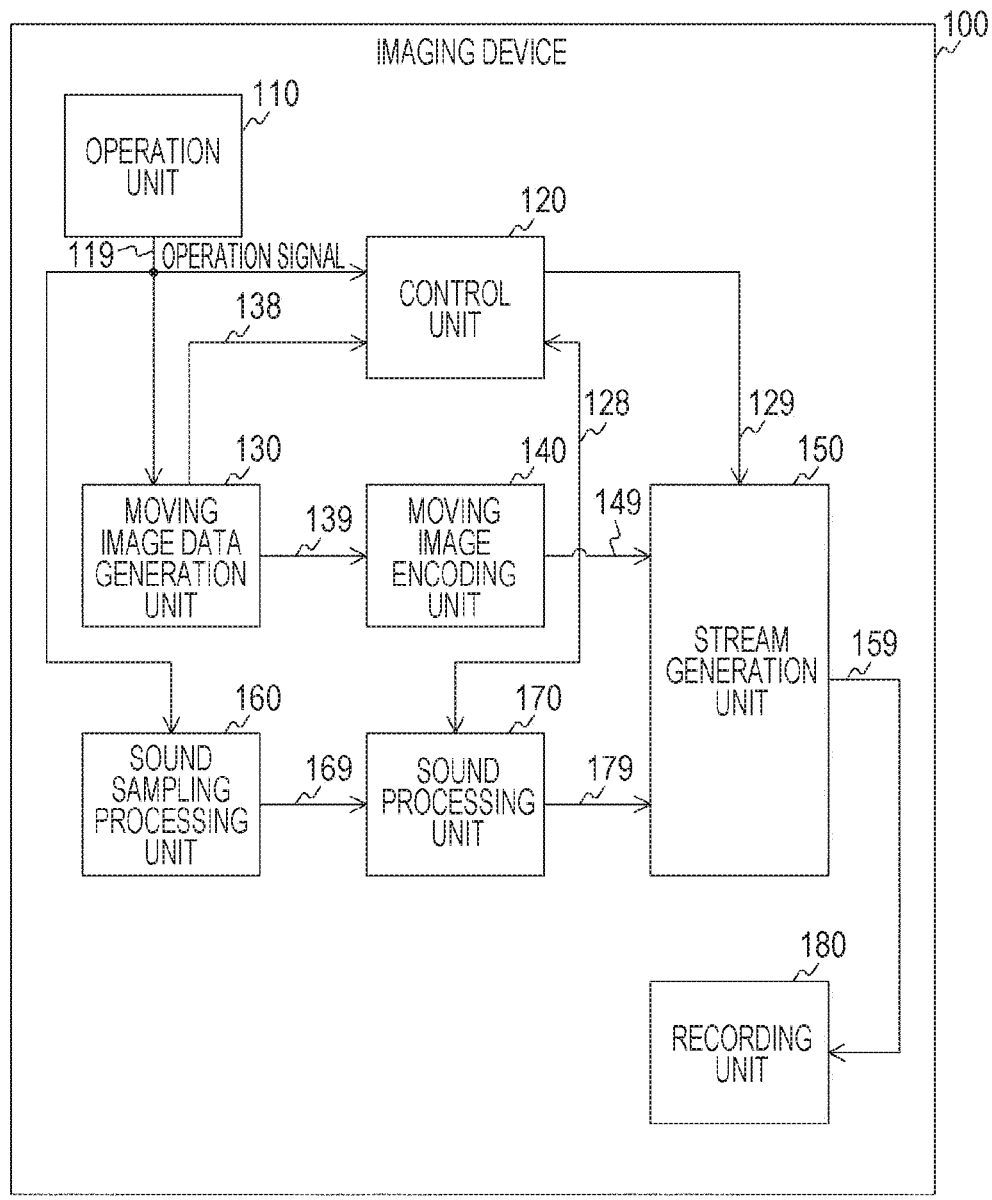
FIG. 1 is a block diagram illustrating a configuration example of an imaging device according to a first embodiment.

FIG. 1 is a block diagram illustrating a configuration example of an imaging device 100 according to a first embodiment. The imaging device 100 includes an operation unit 110, a control unit 120, a moving image data generation unit 130, a moving image encoding unit 140, a stream generation unit 150, a sound sampling processing unit 160, a sound processing unit 170, and a recording unit 180.

The operation unit 110 generates an operation signal according to a user's operation. As this operation signal, for example, a signal indicating the start timing of visual recording and sound recording, and end timing of the visual recording and the sound recording is generated. Here, the start timing of the visual recording and sound recording is assumed to be the same timing. Likewise, the end timing of visual recording and sound recording is assumed to be the same timing. The operation unit 110 supplies the generated operation signal to the control unit 120, the moving image data generation unit 130, and the sound sampling processing unit 160 via the signal line 119.

The moving image data generation unit 130 generates moving image data including a plurality of video frames in chronological order according to the operation signal. The moving image data generation unit 130 supplies the generated moving image data to the moving image encoding unit 140 via a signal line 139.

The moving image encoding unit 140 encodes moving image data. The moving image data is encoded, for example, according to a moving picture experts group (MPEG)-2 standard. The moving image encoding unit 140 packetizes the encoded moving image data into a video packet and supplies the packetized data to the stream generation unit 150 via a signal line 149. Note that the moving image encoding unit 140 may perform encoding according to a standard such as MPEG-4 other than MPEG-2.

The sound sampling processing unit 160 samples sound according to the operation signal to generate a sound signal. For example, a sound is sampled at a sampling frequency of 44.1 kilohertz (kHz), and data of a size (for example, 16 bits) corresponding to the quantization bit number is added to the sound signal every sampling. The sound sampling processing unit 160 supplies the sound signal to the sound processing unit 170 via a signal line 169. Note that the sampling frequency and the quantization bit number are not limited to 44.1 kilohertz (kHz) and 16 bits.

The sound processing unit 170 performs predetermined signal processing on the sound signal and encodes the processed sound signal with a predetermined encoding unit. As this signal processing, for example, processing for adjusting the volume level by gain is performed. Also, the processed sound signal is encoded in units of 20 milliseconds (ms) according to the MPEG standard, for example. Each sound signal encoded in encoding units is called an "audio frame". The sound processing unit 170 packetizes the audio frame into an audio packet and supplies the audio packet to the stream generation unit 150 via the signal line 179.

The control unit 120 controls signal processing for a sound and a moving image. The control unit 120 sets the video reproduction time in each of the video frames and sets the sound reproduction time in each of the audio frames. For example, a presentation time stamp (PTS) in the MPEG standard is set as these reproduction times. Hereinafter, the PTS set in the video frame is referred to as "PTS_V", and the PTS set in the audio frame is referred to as "PTS_A". In addition, the control unit 120 generates metadata and supplies the metadata together with PTS_V and PTS_A to the stream generation unit 150 via a signal line 129. Here, metadata is information attached to a moving image and a sound, and includes, for example, a recording date and time, a title, a recording format, and the like.

The stream generation unit 150 is configured to generate a stream. The stream generation unit 150 adds PTS_V and PTS_A and metadata to the video packet and audio packet, and supplies them as a stream to the recording unit 180 via a signal line 159. The recording unit 180 records streams.

Configuration Example of Moving Image Data Generation Unit

Figure 2:
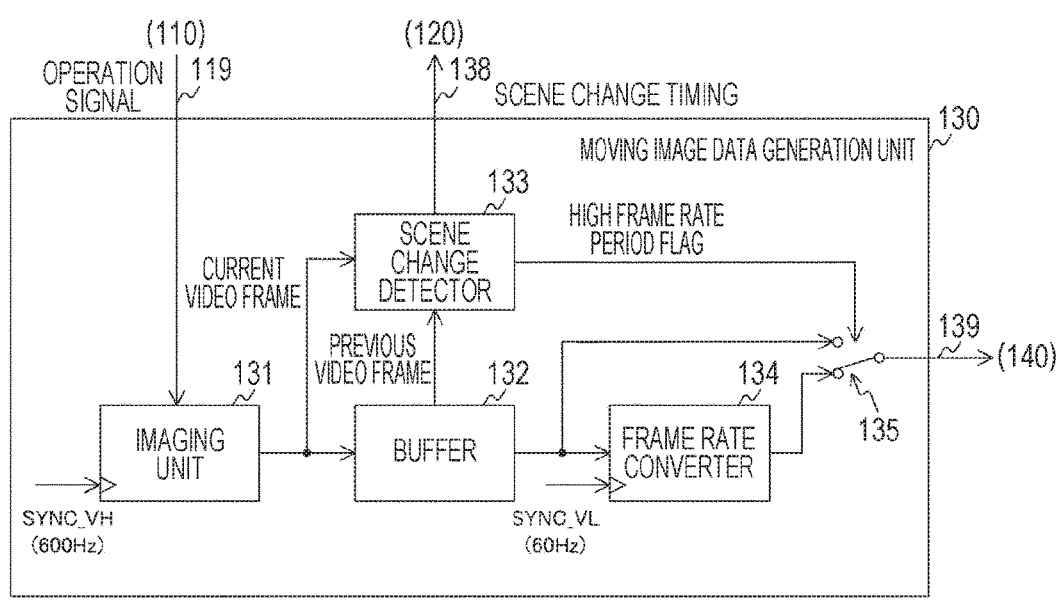
FIG. 2 is a block diagram illustrating a configuration example of a moving image data generation unit according to the first embodiment.

FIG. 2 is a block diagram illustrating a configuration example of the moving image data generation unit 130 according to the first embodiment. The moving image data generation unit 130 includes an imaging unit 131, a buffer 132, a scene change detector 133, a frame rate converter 134, and a switching unit 135.

The imaging unit 131 captures a plurality of video frames in chronological order in synchronization with a predetermined vertical synchronization signal SYNC_VH according to an operation signal. The imaging unit 131 includes, for example, an optical system such as an imaging lens and an imaging element. For example, a complementary metal oxide semiconductor (CMOS) sensor or a charge coupled device (CCD) sensor is used as the imaging element. The frequency of the vertical synchronization signal SYNC_VH is higher than the frame rate at the time of reproduction, for example, 600 Hz (Hz). The imaging unit 131 causes the buffer 132 to hold each of the video frames and supplies the video frame to the scene change detector 133 as the current video frame. The buffer 132 holds a predetermined number of video frames.

The scene change detector 133 detects a video frame in a case where a scene changes, as a detection frame. The scene change detector 133 obtains a video frame before the current frame from the buffer 132 as a previous video frame, compares the current video frame with the previous video frame, and detects the presence or absence of a scene change on the basis of the comparison result. In a case where the scene change occurs, the scene change detector 133 supplies the imaging time of the frame at that time to the control unit 120 as the scene change timing. Further, the scene change detector 133 sets a fixed period including the scene change timing as the high frame rate period, and supplies the high frame rate flag indicating the high frame rate period to the switching unit 135. For example, a period of a predetermined time (1 second, etc.) around the scene change timing is set as the high frame rate period. Also, for example, a value of "1" is set in a high frame rate period flag, and a value of "0" is set outside the high frame rate period.

The frame rate converter 134 reduces the frame rate by thinning out the frame held in the buffer 132. For example, the frame rate converter 134 converts the frame rate of the video frame to the frame rate of the frequency (for example, 60 hertz: Hz) of the vertical synchronization signal SYNC_VL, and supplies the frame rate to the switching unit 135.

The switching unit 135 switches the frame that is to be output according to the high frame rate period flag. In a case where the high frame rate period flag is "1", the switching unit 135 supplies the video frame held in the buffer 132 to the moving image encoding unit 140. On the other hand, in a case where the high frame rate period flag is "0", the switching unit 135 supplies the frame from the frame rate converter 134 to the moving image encoding unit 140.

Note that although the imaging unit 131, the sound sampling processing unit 160, and the like are provided in one device, they may be provided in separate devices. For example, the imaging unit 131 and the sound sampling processing unit 160 may be provided in the imaging device, and other circuits may be provided in a signal processing device.

In addition, although the moving image data generation unit 130 sets the period including the scene change timing as the high frame rate period, the operation unit 110 may set the high frame rate period according to the operation of the user. For example, in a case where a predetermined operation is performed by the user, a fixed period including the timing at which the operation is performed is set as the high frame rate period.

Configuration Example of Control Unit

Figure 3:
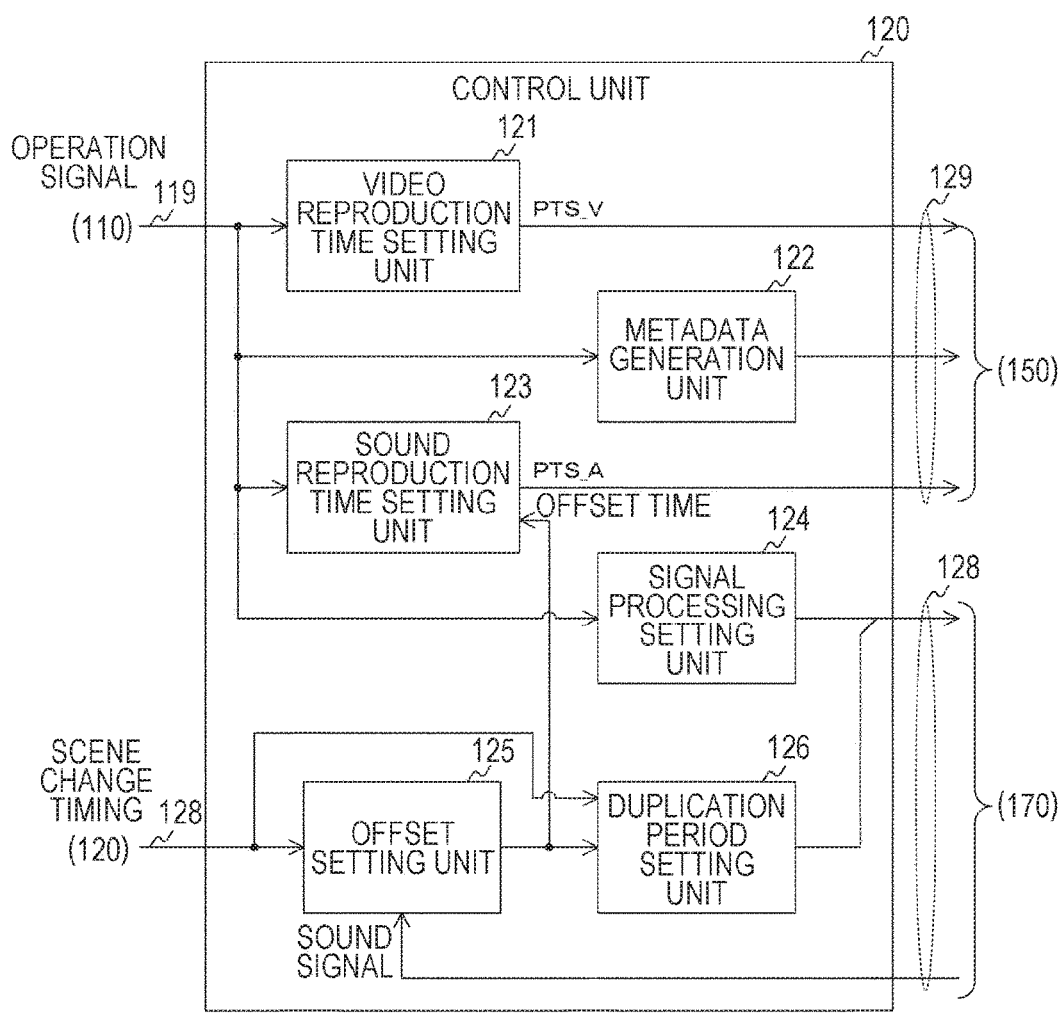
FIG. 3 is a block diagram illustrating a configuration example of a control unit in the first embodiment.

FIG. 3 is a block diagram illustrating a configuration example of the control unit 120 in the first embodiment. The control unit 120 includes a video reproduction time setting unit 121, a metadata generation unit 122, a sound reproduction time setting unit 123, a signal processing setting unit 124, an offset setting unit 125, and a duplication period setting unit 126.

The video reproduction time setting unit 121 sets the video reproduction time (PTS_V) in each of the video frames. The video reproduction time setting unit 121 sets PTS_V for reproducing the video frame in synchronization with the vertical synchronization signal SYNC_VL. The video reproduction time setting unit 121 supplies the set PTS_V to the stream generation unit 150.

The metadata generation unit 122 generates metadata to be added to the stream. Upon start of the visual recording and sound recording, the metadata generation unit 122 generates metadata and supplies the metadata to the stream generation unit 150.

The offset setting unit 125 sets an offset time for shifting the reproduction start timing of the sound signal recorded over the high frame rate period. In a case where the scene change timing is detected, the offset setting unit 125 reads the sound signals before and after the start timing of the high frame rate period including the scene change timing from the sound processing unit 170. In a case where there is a silent period in which the volume level is lower than the predetermined level immediately before the start timing, the offset setting unit 125 sets the same negative offset time as the length of the silent period. In a case where the sign of the offset time is negative, the timing preceding the start timing of the high frame rate period by the offset time is set as the reproduction start time of the sound signal.

Furthermore, in a case where there is no silent period just before the start timing and there is a continuous silent period immediately after the start timing, the offset setting unit 125 sets a positive offset time according to the silent period. This positive offset time is set by the following equation. In a case where the sign of the offset time is positive, the timing at which the offset time has elapsed from the start timing of the high frame rate period is set as the reproduction start time of the sound signal.

$$\text{Offset time} = \text{silent time} \times \text{SYNC\_VH}/\text{SYNC\_VL} \qquad \text{Equation 1}$$

In the above equation, the silent time is the length of the silent period. The unit of the offset time and the silent time is, for example, seconds (s).

The offset setting unit 125 supplies the set offset time to the sound reproduction time setting unit 123 and the duplication period setting unit 126.

The duplication period setting unit 126 sets a period for duplicating the sound signal. For example, the duplication period setting unit 126 sets the same period as the high frame rate period as the duplication period. However, in a case where a positive offset time is set, the start timing of the duplication period is corrected by the offset time. Then, the duplication period setting unit 126 generates a duplication period flag indicating the duplication period and supplies the duplication period flag to the sound processing unit 170. For example, a value of "1" is set in the duplication period and a value of "0" is set outside the duplication period.

The signal processing setting unit 124 sets the number of times of duplication for duplicating the sound signal and the contents of signal processing for each of the duplicated sound signals. Hereinafter, the duplication source sound signal is referred to as "original sound signal", and each of the plurality of sound signals generated by the duplication is referred to as "duplicated sound signal". The number of times of duplication is set, for example, by the following equation.

$$\text{Number of replications} = \text{SYNC\_VH}/\text{SYNC\_VL} \qquad \text{Equation 2}$$

For example, in a case where SYNC_VH is 600 hertz (Hz) and SYNC_LH is 60 hertz (Hz), "10" is set as the number of times of duplication. In a case where the right side is not an integer, rounding processing is performed. Furthermore, in a case where at least one of SYNC_VH and SYNC_LH is changed, the number of times of duplication is reset according to the equation 2.

Further, the signal processing setting unit 124 performs setting so that different signal processing is performed on each of the duplicated sound signals. For example, the signal processing for adjusting the volume level by the gain is executed, and the change amount and change rate of the gain to be changed for each processing are set so that the gain decreases as the reproduction time of the duplicate sound reproduction signal gets slower. As a result, the volume level gradually decreases with the lapse of time during sound reproduction. Note that the signal processing setting unit 124 may set the gain change amount and the like so that the gain increases as the reproduction time gets slower. The signal processing setting unit 124 supplies the set contents (the number of times of duplication and the gain change amount) to the sound processing unit 170.

The sound reproduction time setting unit 123 sets the sound reproduction time (PTS_A) in each of the audio frames. The sound reproduction time setting unit 123 sets PTS_A to be reproduced in synchronization with the vertical synchronization signal SYNC_VL in each of the audio frames. This PTS_A is set at a fixed interval (for example, 1/50 second). However, in a case where the offset time is set, PTS_A is corrected by the offset time. The sound reproduction time setting unit 123 supplies the set PTS_A to the stream generation unit 150. Note that the sound reproduction time setting unit 123 is an example of a reproduction time setting unit described in the claims.

Configuration Example of Sound Processing Unit

Figure 4:
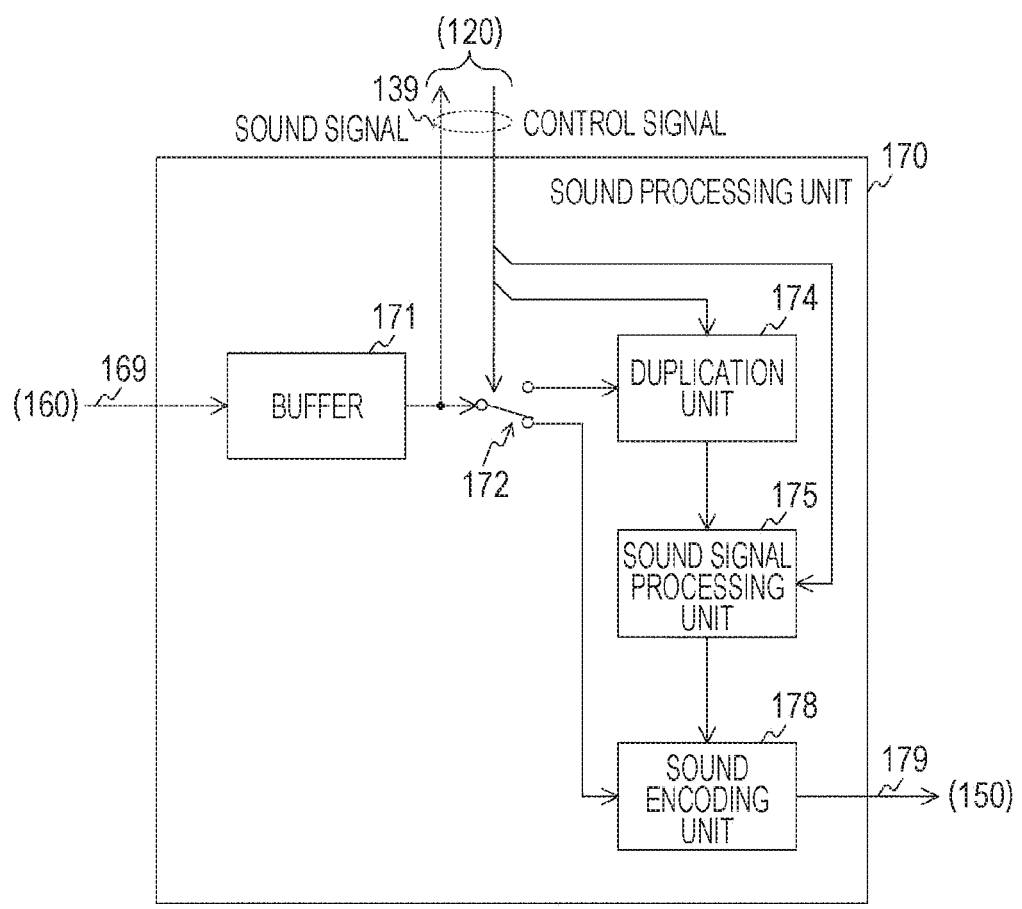
FIG. 4 is a block diagram illustrating a configuration example of a sound processing unit in the first embodiment.

FIG. 4 is a block diagram illustrating a configuration example of the sound processing unit 170 in the first embodiment. The sound processing unit 170 includes a buffer 171, a switching unit 172, a duplication unit 174, a sound signal processing unit 175, and a sound encoding unit 178.

The buffer 171 temporarily holds the sound signal. The held sound signal is supplied to the switching unit 172 and the control unit 120.

The switching unit 172 switches the output destination of the sound signal held in the buffer 171 according to the duplication period flag. For example, the switching unit 172 outputs the sound signal to the duplication unit 174 in a case where the duplication period flag is "1", and outputs the sound signal to the sound encoding unit 178 in a case where the duplication period flag is "0".

The duplication unit 174 duplicates the sound signal by the set number of times of duplication. The duplication unit 174 supplies each of the duplicated sound signals to the sound signal processing unit 175.

The sound signal processing unit 175 executes the set signal processing on each of the duplicated sound signals. For example, signal processing for adjusting the volume level by different gains is executed for each duplicated sound signal. The sound signal processing unit 175 supplies each of the duplicated sound signals after the signal processing to the sound encoding unit 178.

The sound encoding unit 178 encodes a sound signal. The sound encoding unit 178 packetizes the audio frame generated by encoding and supplies the packet to the stream generation unit 150.

Figure 5:
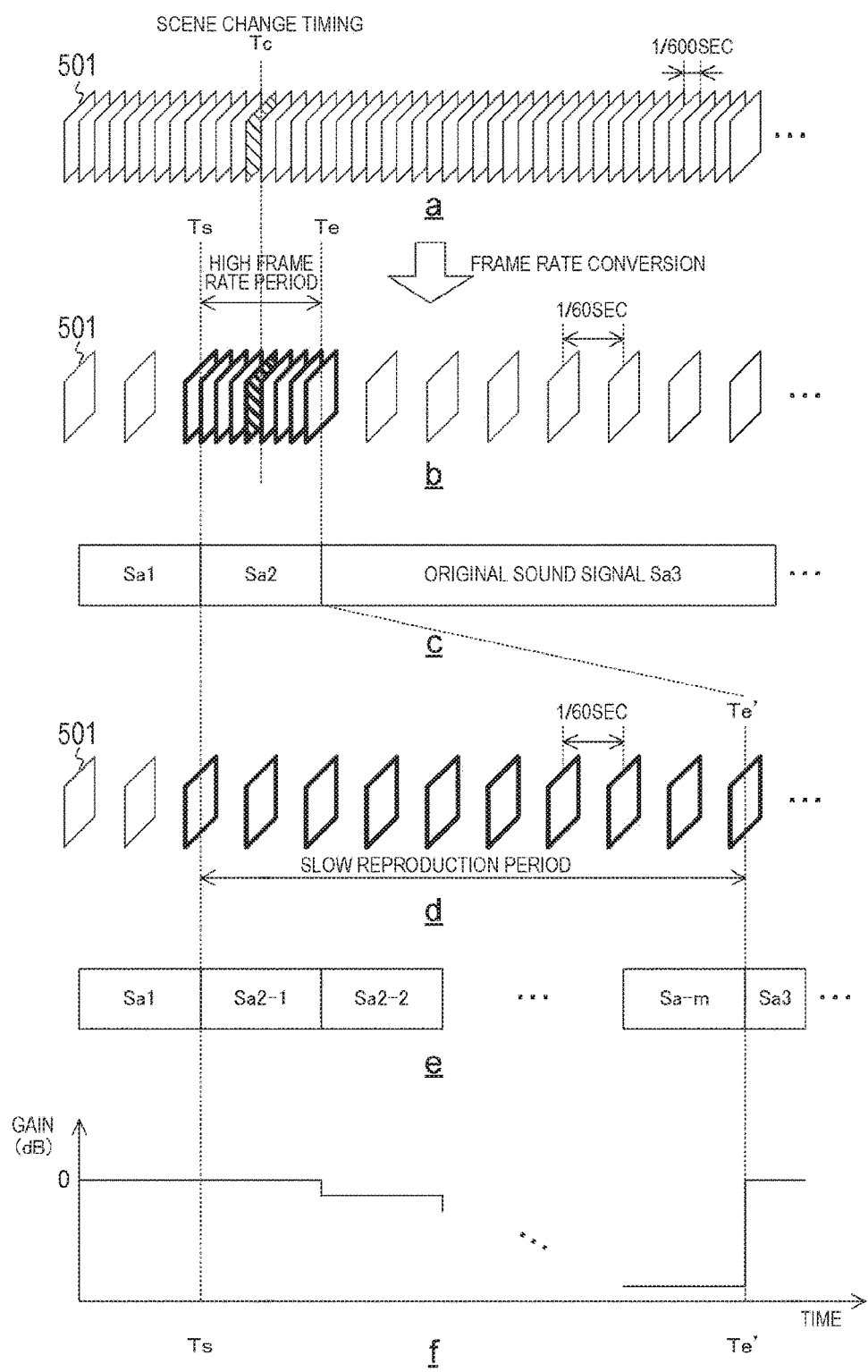
FIG. 5 is a view illustrating an example of a stream in the first embodiment.

FIG. 5 is a view illustrating an example of a stream in the first embodiment. In FIG. 5, a is an example of a video frame captured in synchronization with the vertical synchronization signal SYNC_VH. In a case where the frequency of the vertical synchronization signal SYNC_VH is 600 hertz (Hz), a plurality of video frames such as the video frame 501 are captured every 1/600 seconds. Also, among these video frames, a video frame when the scene changes (Tc) is detected as a detection frame. In a in FIG. 5, the video frame painted with a diagonal line indicates the detection frame.

In FIG. 5, b is a view illustrating an example of a frame after frame rate conversion. A fixed period including the scene change timing Tc is set as a high frame rate period, and outside the high frame rate period, the frame rate is converted to a low frame rate of, for example, 60 hertz (Hz). The video frame enclosed by a bold line in b in FIG. 5 illustrates the video frame within the high frame rate period.

In FIG. 5, c is a view illustrating an example of the sampled sound signal. For example, sound signals Sa1, Sa2 and Sa3 are sequentially generated by sampling. Here, the sound signal Sa1 is a sound signal sampled before the start of the high frame rate period, and the sound signal Sa2 is the sound signal sampled over the high frame rate period. Furthermore, the sound signal Sa3 is a sound signal sampled after the end of the high frame rate period.

In FIG. 5, d is a view illustrating an example of a video frame in which the video reproduction time is set. For each of the video frames including the detection frame, for example, the video reproduction time for performing reproduction at a low frame rate of 60 hertz (Hz) is set. According to the video reproduction time, a moving body captured in the high frame rate period is reproduced with a very slow motion. For example, in a case where the frame rate in the high frame rate period is 600 hertz (Hz) and the frame rate during reproduction is 60 hertz (Hz), the slow reproduction period is extended to 10 times the high frame rate period, and the operating speed decreases to 1/10.

In FIG. 5, e is a view illustrating an example of a sound signal after sound processing. The sound signal Sa2 within the high frame rate period is duplicated, and duplicated sound signals Sa2-1 to Sa2-$m$ are generated. During the slow reproduction period, these duplicated sound signals are reproduced in order. Since these duplicated sound signals are identical to the original sound signal Sa2 of the duplication source, the same sound is repeatedly reproduced during the slow reproduction period.

In FIG. 5, f is a view illustrating an example of the gain used for adjusting the volume of each of the sound signals. The vertical axis of f in FIG. 5 indicates the gain and the horizontal axis indicates the time. A gain of "0" decibels (dB) is set for the duplicated sound signal Sa2-1 to be reproduced first. For the subsequent duplicated sound signals Sa2-2 to Sa2-$m$, a smaller gain is set as the reproduction time gets slower. As a result, the volume level of the repeatedly reproduced sound gradually decreases.

If the sound in the high frame rate period is reproduced as it is without duplication during the slow reproduction period, the period of silence becomes longer and the reproduction quality deteriorates. For example, in a case where the high frame rate period is 1 second and the reproduction time is extended to 10 times (that is, 10 seconds), the silent time continues for 9 seconds. Although it is conceivable to slow down the sound reproduction speed as in Patent Document 1, the slower the reproduction speed, the harder it is to listen to the sound.

On the other hand, since the imaging device 100 duplicates the sound signal recorded over the high frame rate period and repeatedly reproduces the same sound, it is possible to eliminate silent time within the slow reproduction period. In addition, since the imaging device 100 executes different sound processing for each of the repeatedly reproduced sound signals, it is possible to improve the realism in the slow reproduction period.

Figure 6:
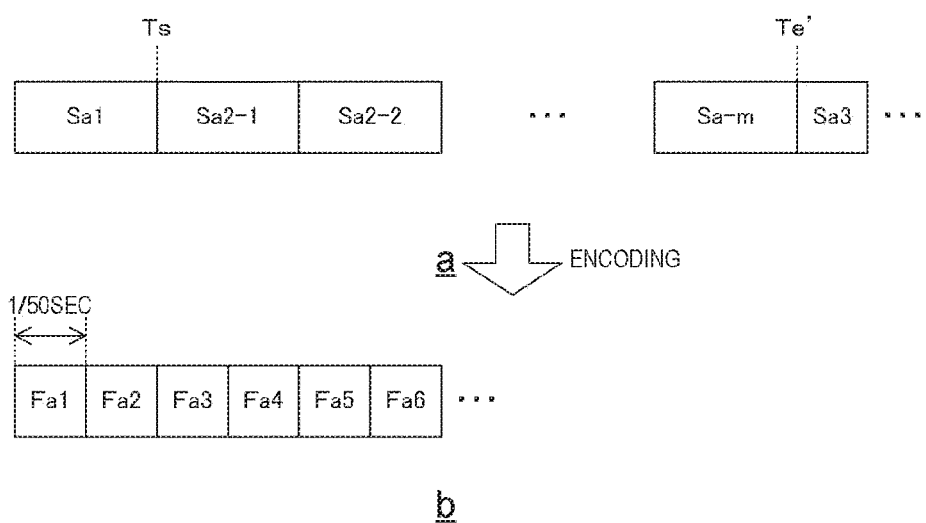
FIG. 6 is a view illustrating an example of a sound signal before and after encoding in the first embodiment.

FIG. 6 is a view illustrating an example of a sound signal before and after encoding in the first embodiment. In FIG. 6, a is a view illustrating an example of a sound signal before encoding, and b in FIG. 6 is an example of a sound frame after encoding. The sound signals Sa1 and Sa2-1 to Sa2-$m$ are encoded with a certain encoding unit (for example, 1/50 second), and audio frames Fa1 and Fa2 and the like are generated.

Figure 7:
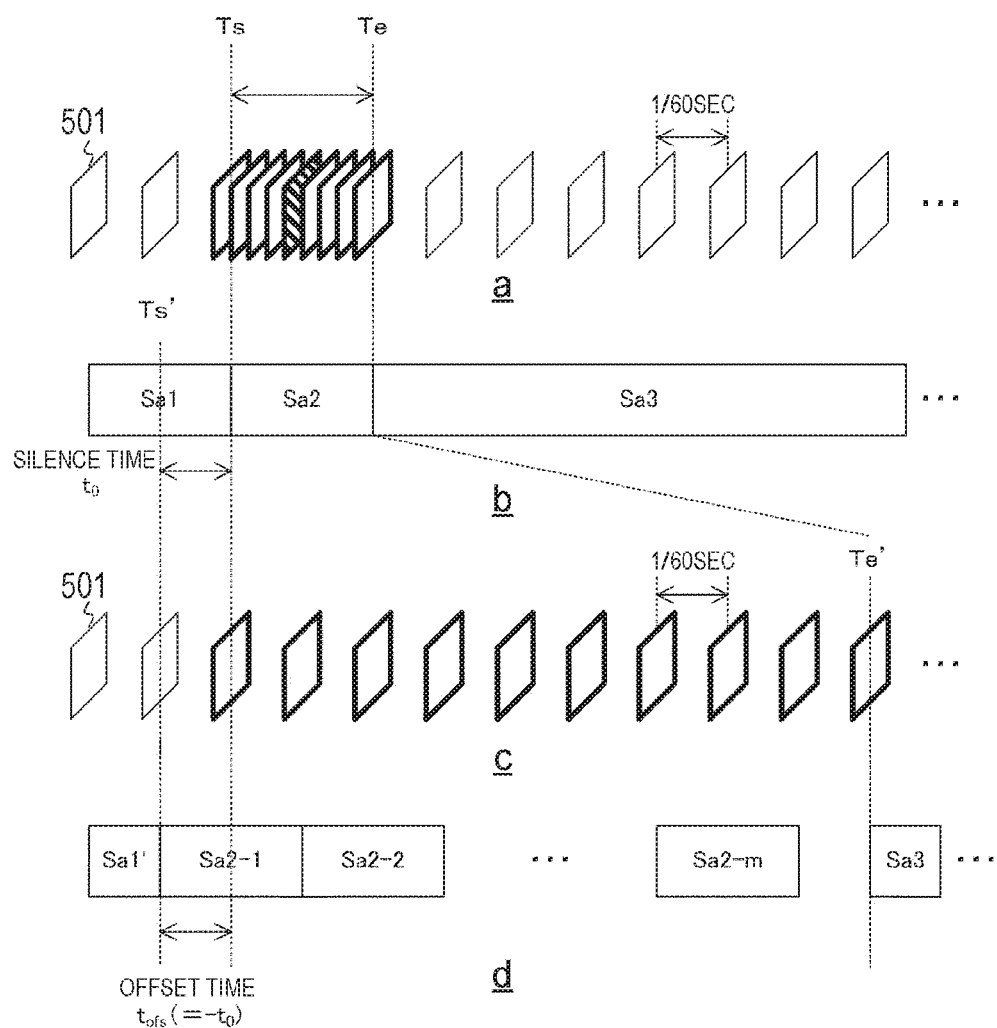
FIG. 7 is a view illustrating an example of a stream in which a negative offset time is set in the first embodiment.

FIG. 7 is a view illustrating an example of a stream in which a negative offset time is set in the first embodiment. In FIG. 7, a is an example of a video frame captured in synchronization with the vertical synchronization signal SYNC_VH. In FIG. 7, b is a view illustrating an example of the sampled sound signal. It is assumed that there is a silent period in which the volume level is less than a certain level with the start timing of the high frame rate period as Ts, over the period from a timing Ts' before Ts by $t_0$ to Ts. In this case, the imaging device 100 sets a negative offset time $t_{ofs}$ with an absolute value of $t_0$.

In FIG. 7, c illustrates an example of a video frame in which the video reproduction time is set. In FIG. 7, d is a view illustrating an example of a sound signal after subjected to sound processing. The timing at which the sound of the first duplicated sound signal Sa-1 is to be reproduced is strictly the start timing Ts of the high frame rate period. However, since there is silent time before Ts, the sound reproduction time of the duplicated sound signal Sa-1 is set to the timing Ts' before the timing Ts. As a result, there is no silent time and sound can be reproduced naturally.

Figure 8:
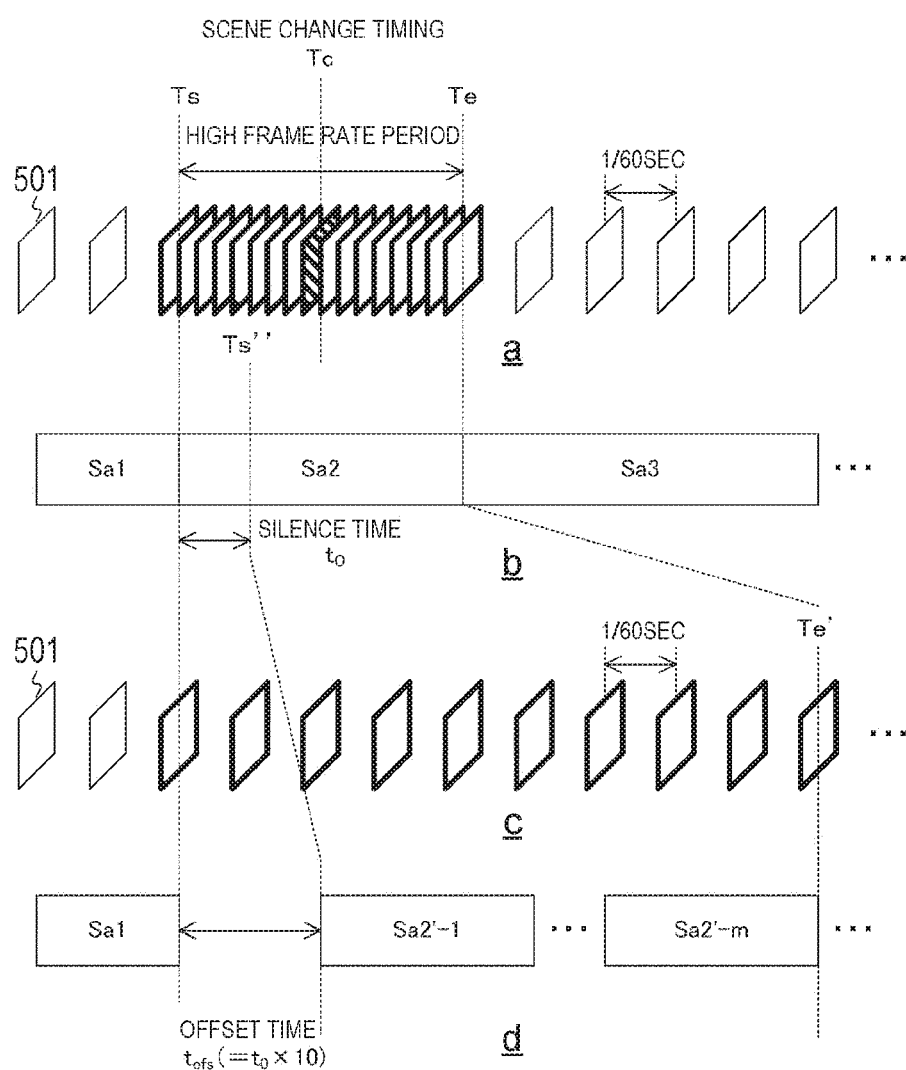
FIG. 8 is a view illustrating an example of a stream in which a positive offset time is set in the first embodiment.

FIG. 8 is a view illustrating an example of a stream in which a positive offset time is set in the first embodiment. In FIG. 8, a is an example of a video frame captured in synchronization with the vertical synchronization signal SYNC_VH. In FIG. 8, b is a view illustrating an example of the sampled sound signal. In the high frame rate period, it is assumed that there is silent time over the period from the start timing Ts to the elapse of $t_0$. In this case, the imaging device 100 sets a positive offset time $t_{ofs}$ of a length corresponding to Ts (for example, 10 times $t_0$).

In FIG. 8, c illustrates an example of a video frame in which the video reproduction time is set. In FIG. 8, d is a view illustrating an example of a sound signal after subjected to sound processing. The timing at which $t_0$ has elapsed from Ts is Ts'', a part of the sound signal Sa2 excluding the silent period, that is, the sound signal from Ts'' to the end timing Te of the high frame rate period is duplicated, and the sound signal Sa2'-1 to Sa2'-$m$ are generated. Then, the sound reproduction time of the first Sa2'-1 is set to the timing when the offset time $t_{ofs}$ has elapsed from Ts. In this way, since the signal except for the silent period is duplicated from the sound signal Sa2 within the high frame rate period, the data amount of the stream can be reduced by the silent period.

Figure 9:
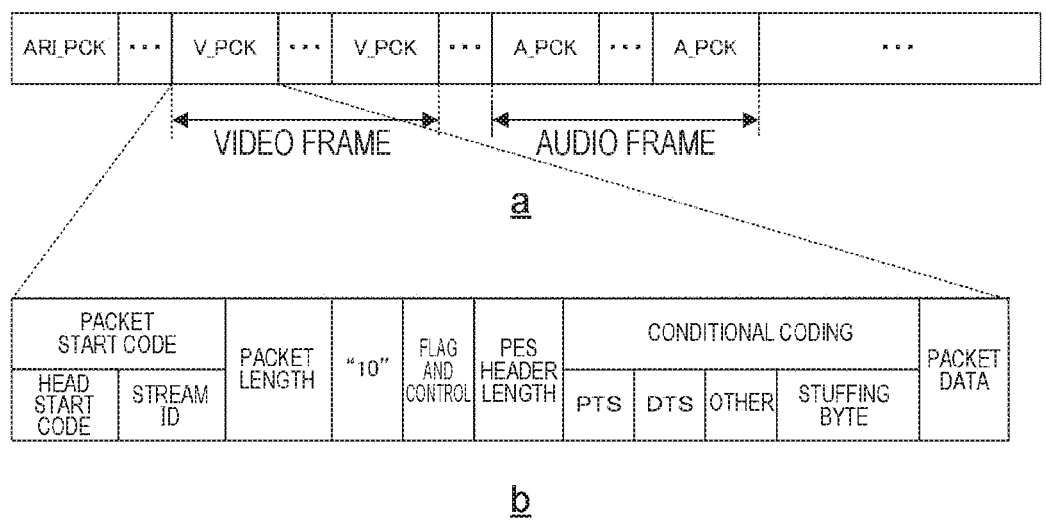
FIG. 9 is view illustrating an example of a data configuration of a stream and a packet in the first embodiment.

FIG. 9 is view illustrating an example of a data configuration of a stream and a packet in the first embodiment. In FIG. 9, a is a view illustrating an example of the data configuration of the stream. In a MPEG-2TS standard, the stream includes, for example, a packet ARI_PCK including auxiliary data, a video packet V_PCK, and an audio packet A_PCK. A video frame is stored in one or more video packets V_PCK, and an audio frame is stored in one or more audio packets A_PCK.

In FIG. 9, b is a view illustrating an example of the data configuration of the video packet V_PCK. In the MPEG-2TS standard, a packet start code, a packet length, a code of "10", a flag and control, a PES header length, conditional coding, and packet data are stored in the video packet V_PCK. The data configuration of the audio packet is similar to that of the video packet.

In the field of the packet start code, a head start code indicating the head of the packet and a stream ID for identifying the stream are stored. In the conditional coding field, PTS indicating the reproduction time and decoding time stamp (DTS) indicating the decoding time are stored. The aforementioned PTS_V and PTS_A are stored in this field.

Operation Example of Imaging Device

Figure 10:
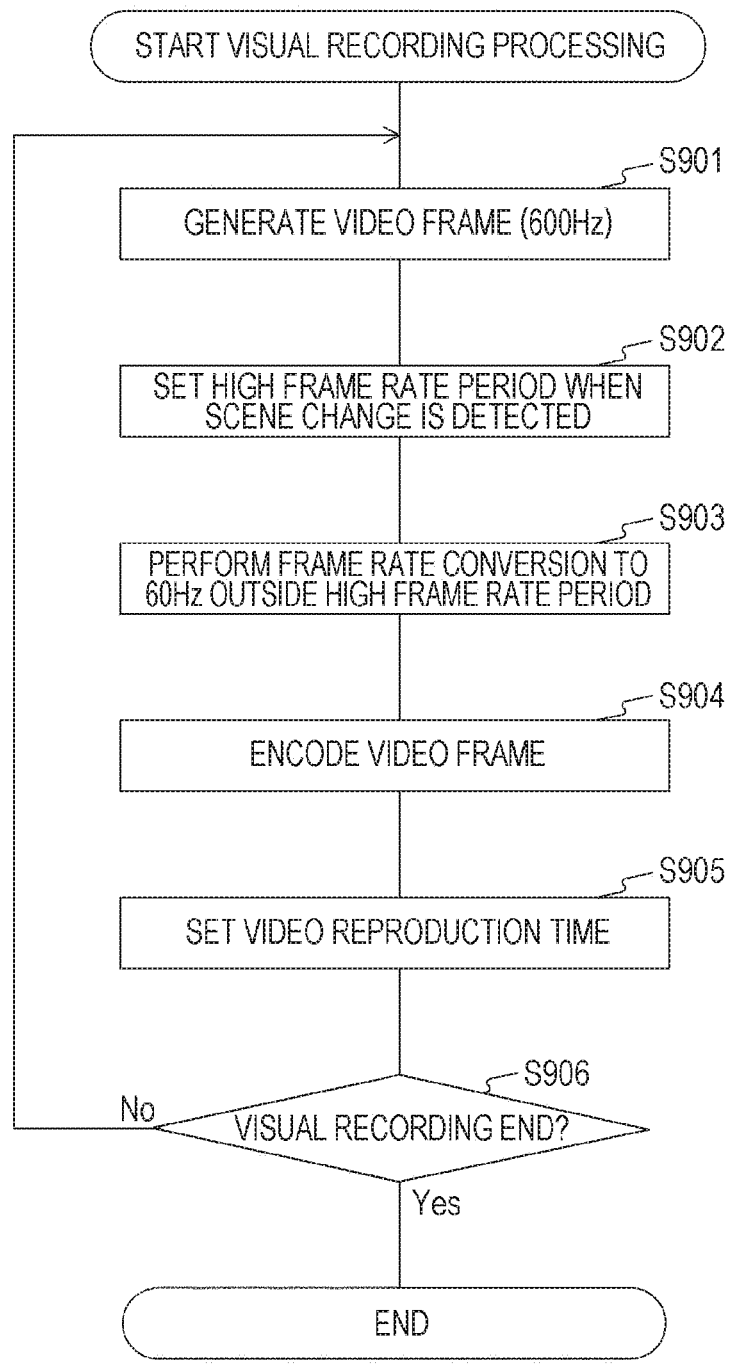
FIG. 10 is a flowchart illustrating an example of a visual recording processing according to the first embodiment.

FIG. 10 is a flowchart illustrating an example of a visual recording processing according to the first embodiment. This visual recording processing is started, for example, when an operation for starting visual recording (such as pressing of a recording button) is performed. The imaging device 100 generates a video frame at a high frame rate of 600 Hz (step S901). Also, the imaging device 100 sets a high frame rate period when a scene change is detected (step S902) and converts the frame rate to a low frame rate of 60 Hz outside the high frame rate period (step S903).

Then, the imaging device 100 encodes the video frame (step S904), and sets the video reproduction time for reproducing at the low frame rate of 60 Hz in the encoded video frame (step S905). The imaging device 100 determines whether or not an operation (such as pressing of a stop button) for ending visual recording is performed (step S906). In a case where the operation for ending the visual recording has not been performed (step S906: No), the imaging device 100 repeats the steps after step S901. On the other hand, in a case where the operation for ending the visual recording is performed (step S906: Yes), the imaging device 100 ends the visual recording processing.

Figure 11:
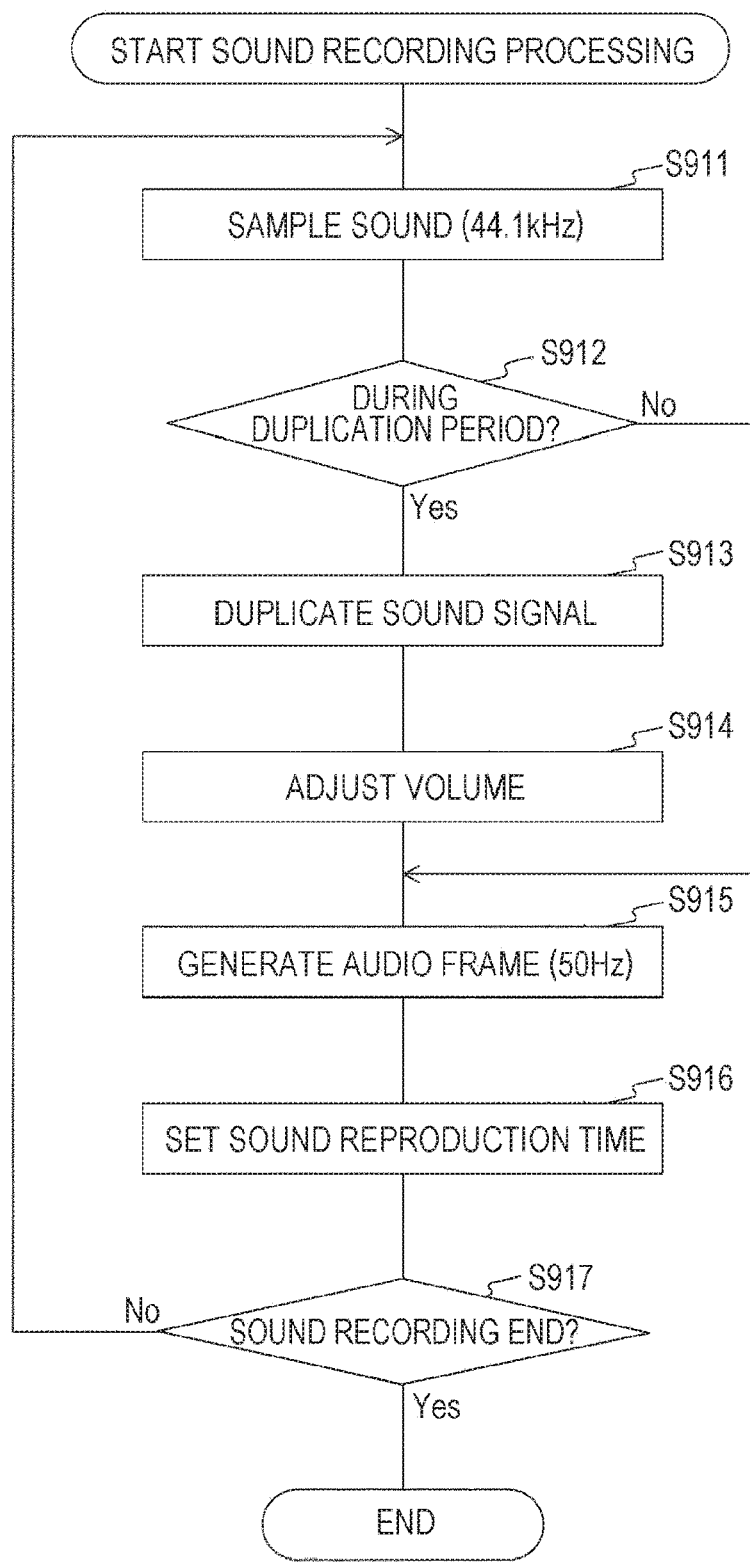
FIG. 11 is a flowchart illustrating an example of a sound recording processing in the first embodiment.

FIG. 11 is a flowchart illustrating an example of a sound recording processing in the first embodiment. This sound recording processing is started, for example, when an operation for starting visual recording (such as pressing of a recording button) is performed. The imaging device 100 performs sound sampling at a sampling frequency of 44.1 kilohertz (kHz) (step S911). Then, the imaging device 100 determines whether or not the sampled sound signal is a signal within the duplication period (step S912). In a case where the sampled sound signal is a sound signal within the duplication period (step S912: Yes), the imaging device 100 duplicates the sound signal (step S913) and adjusts the volume by different gain for each duplicated sound signal (step S914).

In a case where the sampled sound signal is not a sound signal within the duplication period (step S912: No), or after step S914, the imaging device 100 encodes the sound signal at a frame rate of 50 hertz (Hz) or the like to generate an audio frame (step S915). The imaging device 100 sets a sound reproduction time for each audio frame (step S916), and determines whether or not an operation (such as pressing of a stop button) for ending the sound recording has been performed (step S917). In a case where the operation for ending the sound recording is not performed (step S917: No), the imaging device 100 repeats the steps after step S911. On the other hand, in a case where the operation for ending the sound recording is performed (step S917: Yes), the imaging device 100 ends the sound recording processing.

As described above, according to the first embodiment of the present technology, since the imaging device 100 duplicates the sound signal within the high frame rate period and executes different sound processing for each of the duplicated sound signals, it is possible to repeatedly reproduce the same sound while changing the volume and the like. Accordingly, there is no period of silence in the slow reproduction period, and the realism is improved, so that the reproduction quality of the sound can be improved.

First Modification

In the above-described first embodiment, the reproduction speed of the sound signal is not changed, and the sound signal is reproduced as it is; however, the sound signal may be duplicated after changing the reproduction speed. Changing the reproduction speed of sound is also called sound speed conversion. As the reproduction time is delayed, the reproduction time of each of the duplicate sound signals becomes longer, so that the number of times of duplication can be reduced. Also, by moderately delaying the reproduction speed, it is easier to hear the sound. However, if the reproduction speed is set too low, it may be difficult for the user to hear the sound, so that a scale factor for reducing the reproduction speed is preferably not more than ½ times. The imaging device 100 according to a first modification of the first embodiment is different from the first embodiment in that the imaging device 100 performs duplication after delaying the reproduction speed of the sound signal.

Figure 12:
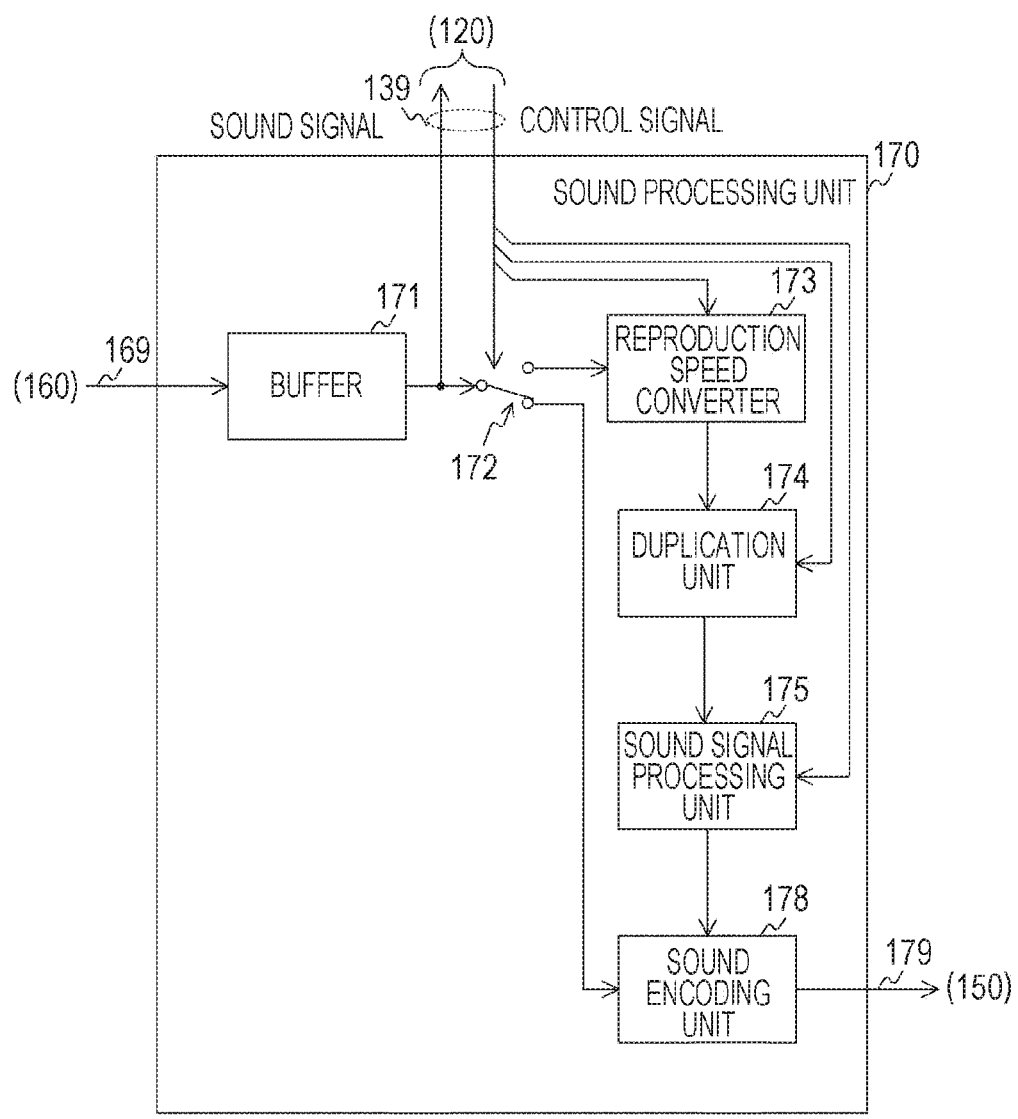
FIG. 12 is a block diagram illustrating a configuration example of a sound processing unit in a first modification.

FIG. 12 is a block diagram illustrating a configuration example of a sound processing unit in the first modification. The sound processing unit 170 of the first modification is different from the first embodiment in that the sound processing unit 170 further includes a reproduction speed converter 173.

The reproduction speed converter 173 delays the reproduction speed of the sound signal from the switching unit 172 with a fixed scale factor n (for example, ½). This scale factor is the ratio of the reproduction speed after conversion to the reproduction speed before conversion. The reproduction speed converter 173 supplies the sound signal having the converted reproduction speed, to the duplication unit 174.

Further, the control unit 120 of the first modification further sets the scale factor for delaying the reproduction speed, and supplies the set value to the reproduction speed converter 173.

Furthermore, in the first modification, the number of times of duplication is set by the following equation instead of the equation 2.

$$\text{Number of times of duplication} = \text{SYNC\_VH} \times n / \text{SYNC\_VL} \quad \text{Equation 3}$$

For example, in a case where SYNC_VH is 600 hertz (Hz), SYNC_LH is 60 hertz (Hz), and the scale factor for the reproduction speed is ½, "5" is set as the number of times of duplication.

Note that in the first modification, in the control unit 120, a ratio n' of the reproduction time before and after the conversion may be set instead of a ratio n of the reproduction speed before and after the conversion. In this case, the following equation is used instead of the equation 3.

$$\text{Number of times of duplication} = \text{SYNC\_VH} / (\text{SYNC\_VL} \times n') \quad \text{Equation 4}$$

Figure 13:
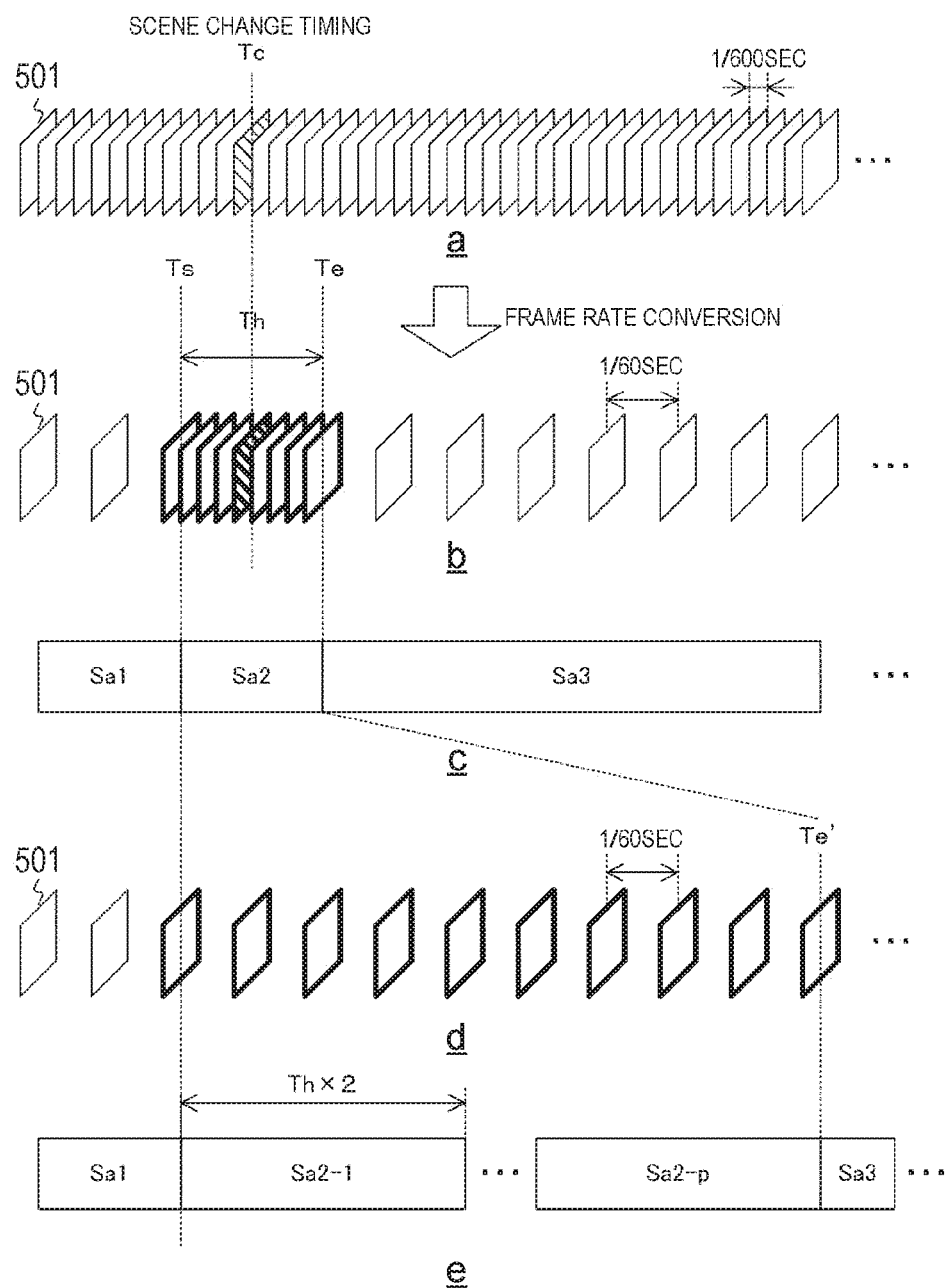
FIG. 13 is a view illustrating an example of a stream in the first modification of the first embodiment.

FIG. 13 is a view illustrating an example of a stream in the first modification of the first embodiment. In FIG. 13, a is an example of a video frame captured in synchronization with the vertical synchronization signal SYNC_VH. In FIG. 13, b is an example of a frame after frame rate conversion. In FIG. 13, c is a view illustrating an example of the sampled sound signal. In FIG. 13, d illustrates an example of a video frame in which a video reproduction time is set. In FIG. 13, e is a view illustrating an example of a sound signal after sound processing.

Conversion processing is performed on the original sound signal Sa2 such that the reproduction speed is delayed, and duplicated sound signals Sa2-1 to Sa2-$p$ having longer reproduction time are generated.

As described above, according to the first modification of the present technology, since the imaging device 100 delays the reproduction speed of the sound signal recorded during the high frame rate period, it is possible to reduce the number of times of duplication and make it easier to hear the sound.

Second Modification

In the first embodiment described above, the imaging device 100 adjusts the volume level by the gain, but in addition to the volume level adjustment processing, equalizer processing for changing the frequency characteristic of the sound signal may be performed. The imaging device 100 according to a second modification of the first embodiment is different from the first embodiment in that the equalizer processing is further performed.

Figure 14:
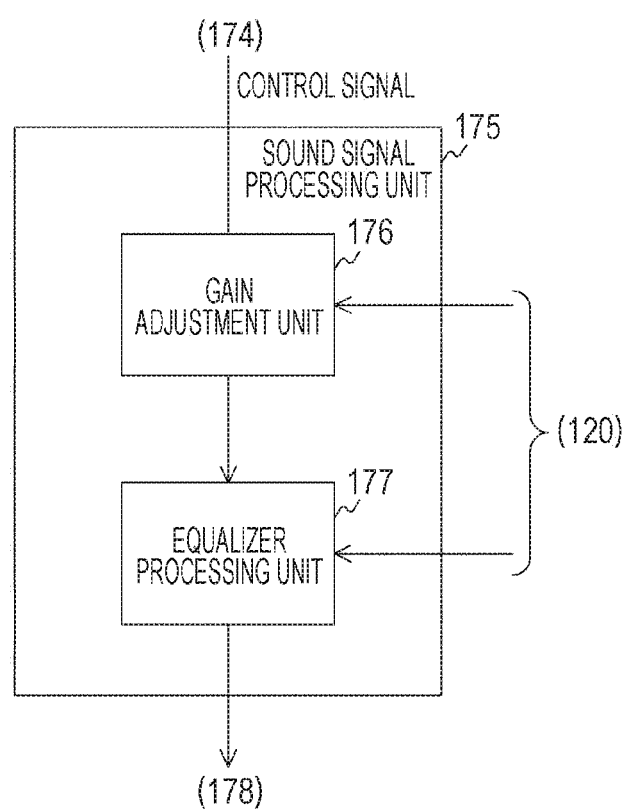
FIG. 14 is a block diagram illustrating a configuration example of a sound signal processing unit in a second modification of the first embodiment.

FIG. 14 is a block diagram illustrating a configuration example of the sound signal processing unit 175 in a second modification of the first embodiment. The sound signal processing unit 175 of the second modification includes a gain adjustment unit 176 and an equalizer processing unit 177.

The gain adjustment unit 176 adjusts the volume level by the gain. The gain adjustment unit 176 supplies the adjusted sound signal to the equalizer processing unit 177. The equalizer processing unit 177 performs equalizer processing for changing the frequency characteristics of the duplicated sound signals to mutually different characteristics. For example, the equalizer processing unit 177 performs processing of making the gain for the low frequency region lower than the predetermined threshold relatively higher than the gain for a high frequency region higher than the threshold, for each duplicated sound signal. The lower the reproduction time, the lower the threshold value. With this, it is possible to obtain an acoustic effect in which the degree of emphasis of sound in the low frequency region gradually increases with the lapse of time. The equalizer processing unit 177 supplies the sound signal after the equalization processing to the sound encoding unit 178. Note that the method of changing the frequency characteristic is not limited to the emphasis of the low frequency region. The imaging device 100 may gradually emphasize the high frequency region. Further, the imaging device 100 may change the gain with respect to a certain band centering on a predetermined center frequency.

Note that the sound signal processing unit 175 performs the adjustment of the sound volume level and the equalizer processing. However, the sound signal processing unit 175 may be configured to perform only the equalizer processing.

Figure 15:
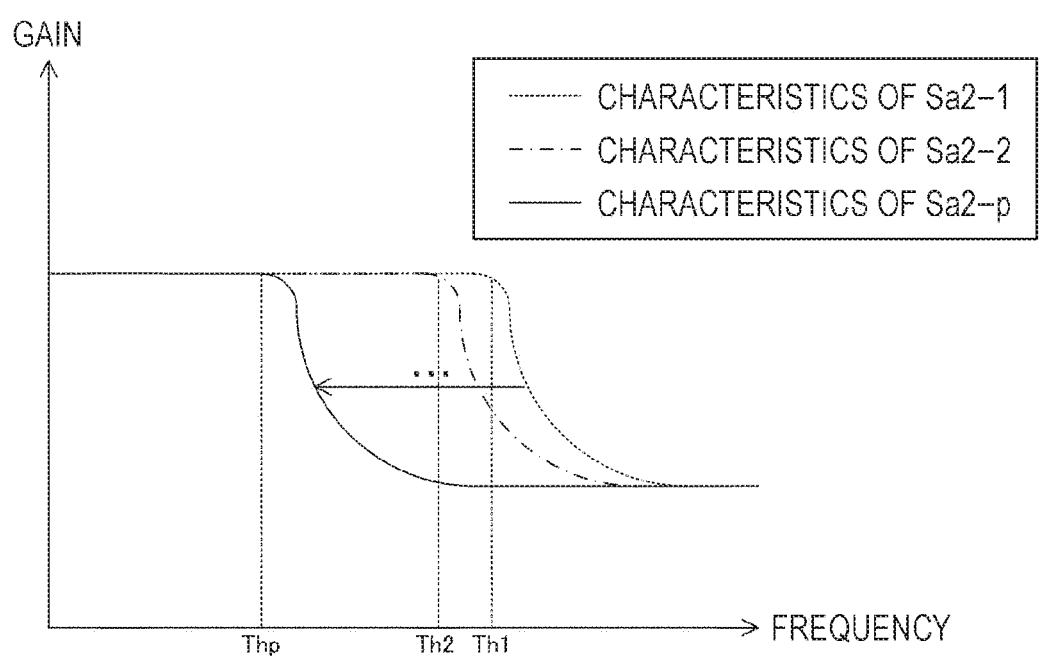
FIG. 15 is a graph illustrating an example of a frequency characteristic in the second modification of the first embodiment.

FIG. 15 is a graph illustrating an example of a frequency characteristic in the second modification of the first embodiment. In FIG. 15, the vertical axis represents the gain and the horizontal axis represents the frequency. Further, the curve of the dotted line indicates the characteristic of the duplicated sound signal Sa2-1 reproduced first in the slow reproduction period, and the curve of the one-dot chain line indicates the characteristics of the duplicated sound signal Sa2-2 to be reproduced next. The solid line curve shows the characteristics of the duplicated sound signal Sa2-$p$ that is reproduced last in the slow reproduction period. In the duplicated sound signal Sa-1, the gain in the high frequency region is adjusted to be relatively lower than the threshold Th1, and in the duplicated sound signal Sa-2, the gain is adjusted to be relatively low with respect to the threshold Th2 lower than the threshold Th1. Furthermore, in the duplicated sound signal Sa-p, the gain in the high frequency region is adjusted to be relatively lower than the threshold Thp lower than these values. As a result, it is possible to obtain an acoustic effect in which the degree of cooperation with respect to the sound in the low frequency region is increased with the lapse of time.

As described above, according to the second modification of the present technology, since the imaging device 100 performs equalizer processing that changes the frequency characteristics to different frequency characteristics for each duplicated sound signal, it is possible to realize a characteristic acoustic effect in the slow reproduction period.

2. Second Embodiment

In the first embodiment described above, the imaging device 100 performs duplication and signal processing of sound signals at the time of recording; however, the above processing may be executed at the time of reproduction without performing the processing at the time of recording. By not duplicating the sound signal at the time of recording, it is possible to reduce the data size necessary for recording the stream. The imaging device 100 according to the second embodiment is different from the first embodiment in that duplication processing and signal processing of a sound signal are performed during reproduction.

Figure 16:
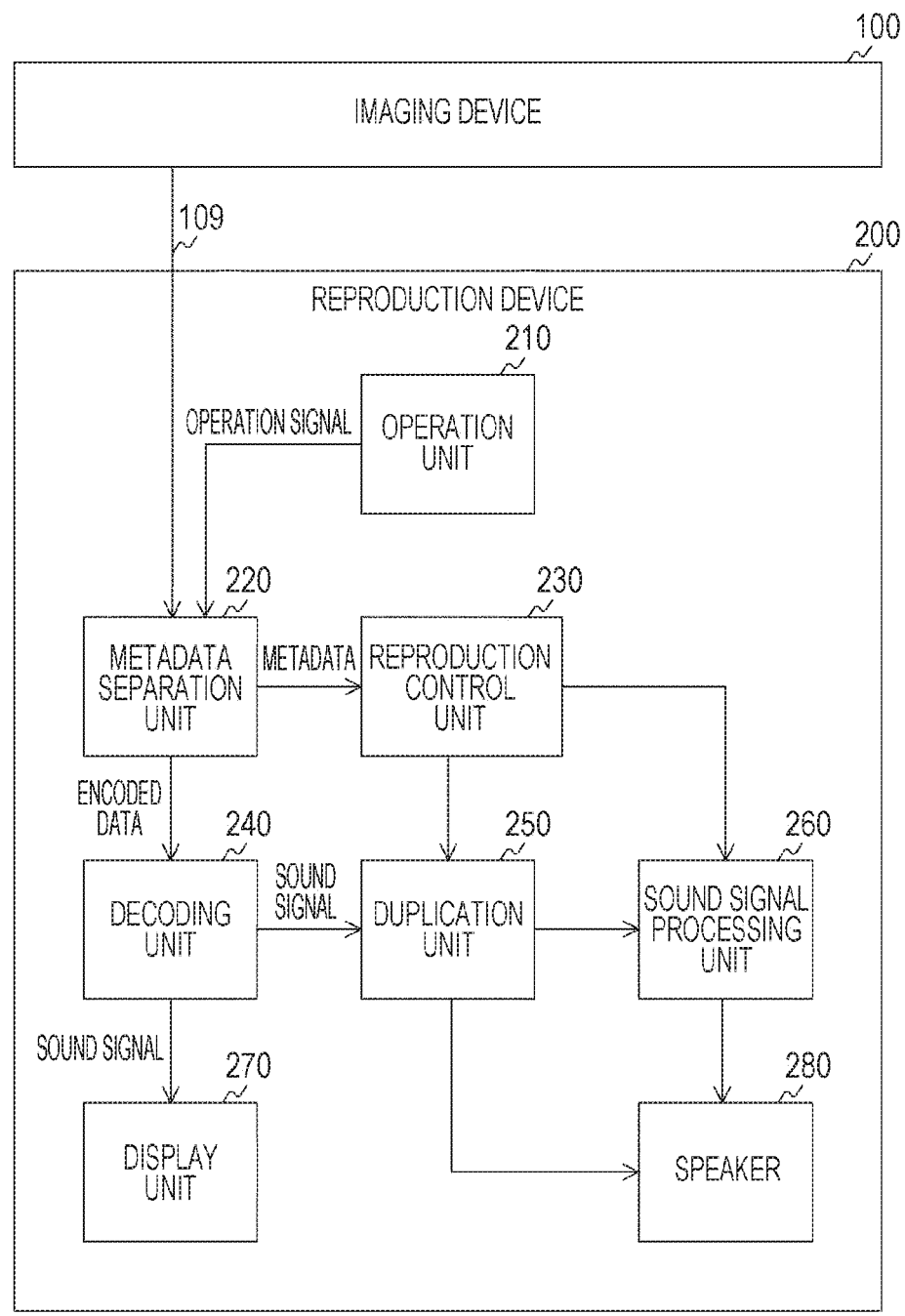
FIG. 16 is a block diagram illustrating a configuration example of an imaging system according to a second embodiment.

FIG. 16 is a block diagram illustrating a configuration example of an imaging system according to a second embodiment. This imaging system includes an imaging device 100 and a reproduction device 200.

The imaging device 100 according to the second embodiment stores in the metadata detailed setting data indicating the sound reproduction time of the sound signal to be duplicated, the number of times of reproduction, and the content of the sound processing (gain change amount) and supplies the stream to which the data is added to the reproduction device 200. However, in the imaging device 100, duplication of the sound signal and signal processing are not executed. Further, in the metadata, the detailed setting data is recorded in a region for user data or auxiliary data. A specific example of a region for recording detailed setting data will be described later.

The reproduction device 200 is a device that reproduces a stream, and includes an operation unit 210, a metadata separation unit 220, a reproduction control unit 230, a decoding unit 240, a duplication unit 250, a sound signal processing unit 260, a display unit 270, and a speaker 280.

The operation unit 210 generates an operation signal according to a user's operation. The operation signal includes, for example, a signal instructing the start or stop of reproduction of the stream. The operation unit 210 supplies the operation signal to the metadata separation unit 220.

The metadata separation unit 220 acquires a stream according to the operation signal and separates the stream into metadata and encoded data (video packet or audio packet). The metadata separation unit 220 supplies the separated metadata to the reproduction control unit 230 and supplies the encoded data to the decoding unit 240.

The decoding unit 240 decodes the encoded data into the original sound signal and a video signal. The decoding unit 240 supplies the sound signal obtained by decoding to the duplication unit 250 and supplies the video signal to the display unit 270. The display unit 270 displays the video signal.

The reproduction control unit 230 controls the duplication unit 250 and the sound signal processing unit 260. The reproduction control unit 230 obtains the sound reproduction time of the sound signal to be duplicated, the number of times of duplication, and the gain change amount, and supplies the audio reproduction time and the number of times of duplication to the duplication unit 250. In addition, the reproduction control unit 230 supplies the gain change amount to the sound signal processing unit 260.

The duplication unit 250 duplicates the sound signal under the control of the reproduction control unit 230. Every time the sound signal from the decoding unit 240 is supplied, the duplication unit 250 determines whether or not the sound reproduction time coincides with the sound reproduction time from the reproduction control unit 230. In the case of coincidence, the duplication unit 250 duplicates the sound signal by the number of times of duplication set by the reproduction control unit 230 and supplies the sound signal to the sound signal processing unit 260. On the other hand, in a case where the sound reproduction times do not coincide with each other, the duplication unit 250 supplies the sound signal to the speaker 280 without duplicating the sound signal.

The sound signal processing unit 260 executes different sound processing for each of the duplicated sound signals under the control of the reproduction control unit 230. Every time the duplicate sound signal is supplied, the sound signal processing unit 260 adjusts the volume level by the current gain, and changes the gain by the set change amount. For example, in a case where "−10 decibels (dB)" is set as the gain change amount, the sound signal processing unit 260 changes the volume level by 0 decibels (dB) for the first duplicated sound signal, and changes the volume level by −10 decibels (dB) for the next duplicated sound signal.

Similarly thereafter, the volume level is adjusted by changing the gain by −10 decibels (dB). The sound signal processing unit 260 supplies the duplicated sound signal after adjustment of the volume level to the speaker 280. The speaker 280 converts a sound signal into a physical vibration to reproduce sound.

Note that in the second embodiment, the reproduction device 200 may further change the reproduction speed and perform equalizer processing. In a case of changing the reproduction speed, the scale factor for changing the reproduction speed is set in the metadata. In addition, in a case of performing the equalizer processing, the threshold value and the gain change amount of the center frequency are set in the metadata.

Further, although the reproduction device 200 is provided outside the imaging device 100, the function of the reproduction device 200 may be provided in the imaging device 100.

FIG. 17 is a block diagram illustrating a configuration example of the sound processing unit 170 in the second embodiment. The sound processing unit 170 according to the second embodiment is different from the first embodiment in that the sound processing unit 170 does not include the switching unit 172, the duplication unit 174, and the sound signal processing unit 175.

FIG. 18 is a view illustrating an example of a field to be set in a case of using MPEG 4-AAC in the second embodiment. As illustrated in FIG. 18, in a metadata 510 of the MPEG 4-AAC standard, for example, detailed setting data is stored in a data stream element (DSE) region 511.

FIG. 19 is a view illustrating an example of a detailed setting data in the second embodiment. In this detailed setting data, the sound reproduction time of the sound signal to be duplicated, the number of times of reproduction, and the gain change amount are set. For example, in a case of duplicating the sound signal reproduced from the sound reproduction time Ts1 ten times and changing the respective gains by −10 decibels (dB) at a time, "Ts1", "10" and "−10 dB" are set.

FIG. 20 is a view illustrating an example of a field to be set in a case of using a MPEG 4-system in the second embodiment. As illustrated in FIG. 20, in the metadata 520 of the MPEG 4-system standard, for example, the detailed setting data is stored in a udta region 521.

FIG. 21 is a view illustrating an example of a field to be set in a case of using a HMMP file format in the second embodiment. As illustrated in FIG. 21, in the metadata 530 of the HMMP standard, for example, detailed setting data is stored in a uuid area 531.

Figure 22:
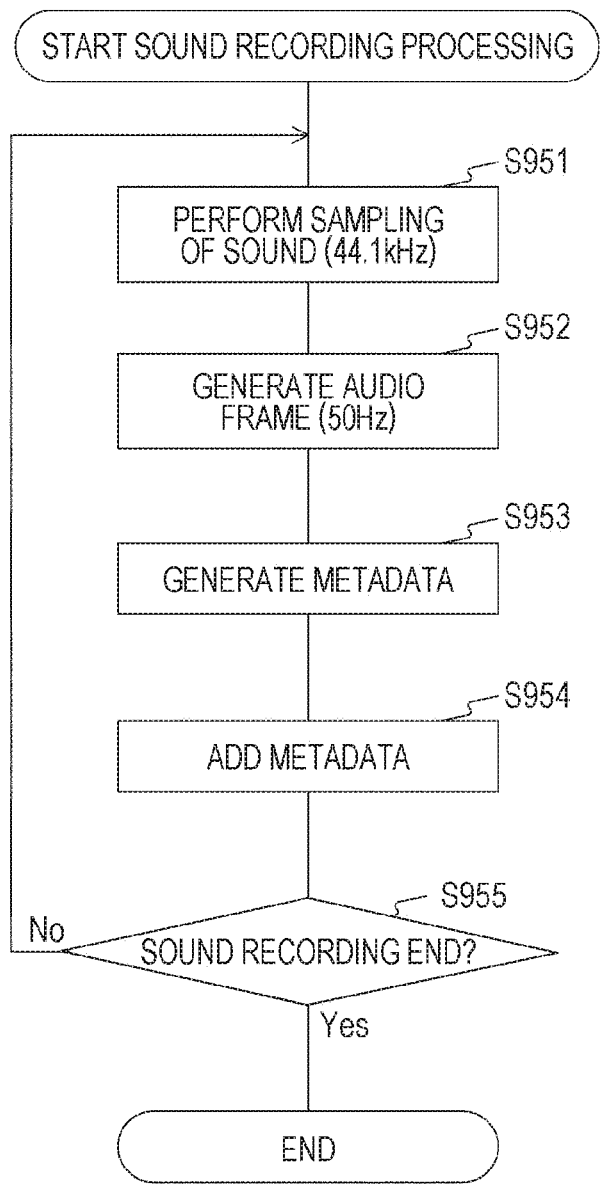
FIG. 22 is a flowchart illustrating an example of a sound recording processing in the second embodiment.

FIG. 22 is a flowchart illustrating an example of a sound recording processing in the second embodiment. The imaging device 100 samples sound (step S951), and encodes the sound signal to generate an audio frame (step S952). Further, the imaging device 100 generates metadata storing detailed setting data (step S953), and adds the metadata to the audio frame (step S954). Then, the imaging device 100 determines whether or not an operation for ending the recording has been performed (step S955). In a case where the operation for ending the recording is not performed (step S955: No), the imaging device 100 repeats the steps after step S951. On the other hand, in a case where the operation for ending the sound recording is performed (step S955: Yes), the imaging device 100 ends the sound recording processing.

Figure 23:
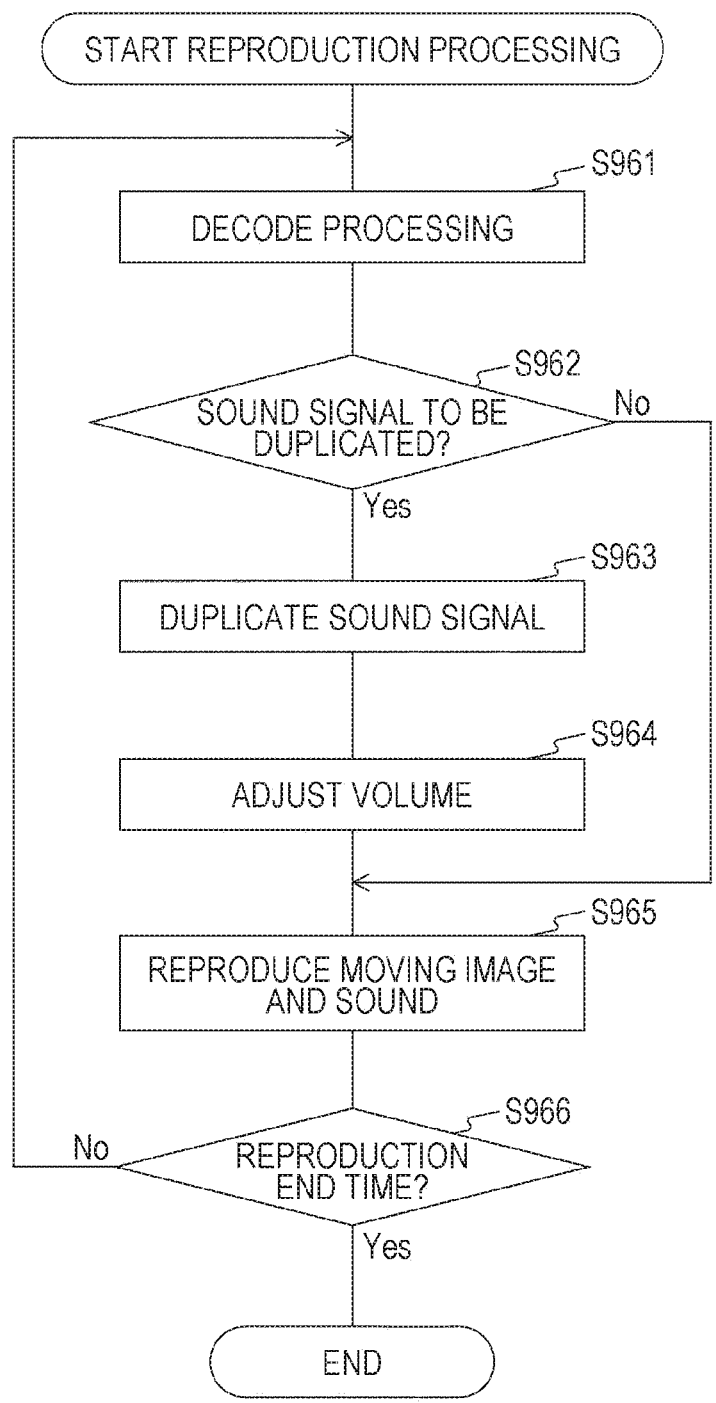
FIG. 23 is a flowchart illustrating an example of reproduction processing in the second embodiment.

FIG. 23 is a flowchart illustrating an example of reproduction processing in the second embodiment. This operation starts, for example, when an operation for reproducing a stream (such as pressing of a reproduction button) is performed.

The reproduction device 200 performs duplication processing to decode the encoded data (step S961), and refers to the metadata to determine whether or not the decoded sound signal is a sound signal to be duplicated (step S962). In a case where the decoded sound signal is the sound signal to be duplicated (step S962: Yes), the reproduction device 200 duplicates the sound signal (step S963), and adjusts the volume levels of the duplicated sound signal by mutually different gains (step S964).

In a case where the decoded sound signal is not the sound signal to be duplicated (step S962: No) or after step S964, the reproduction device 200 reproduces the moving image and the sound using the display unit and the speaker (step S965). Then, the reproduction device 200 determines whether or not the reproduction end time has come (step S966). In a case where the reproduction end time has not come (step S966: No), the imaging device 100 repeats the steps after step S961. On the other hand, in a case where the reproduction end time has come (step S966: Yes), the reproduction device 200 ends the reproduction processing.

As described above, according to the second embodiment of the present technology, since the reproduction device 200 performs duplication and signal processing of the sound signal, there is no need for the imaging device 100 to duplicate the sound signal at the time of recording, and the data size necessary for recording the stream can be reduced.

3. Third Embodiment

In the second embodiment described above, the number of times of duplication and the gain change amount are fixed values, but at least one of the number of times of duplication and the gain change amount may be changed according to the operation of the user. The imaging system according to the third embodiment is different from the second embodiment in that the number of times of duplication and the gain change amount are changed according to the operation of the user.

Figure 24:
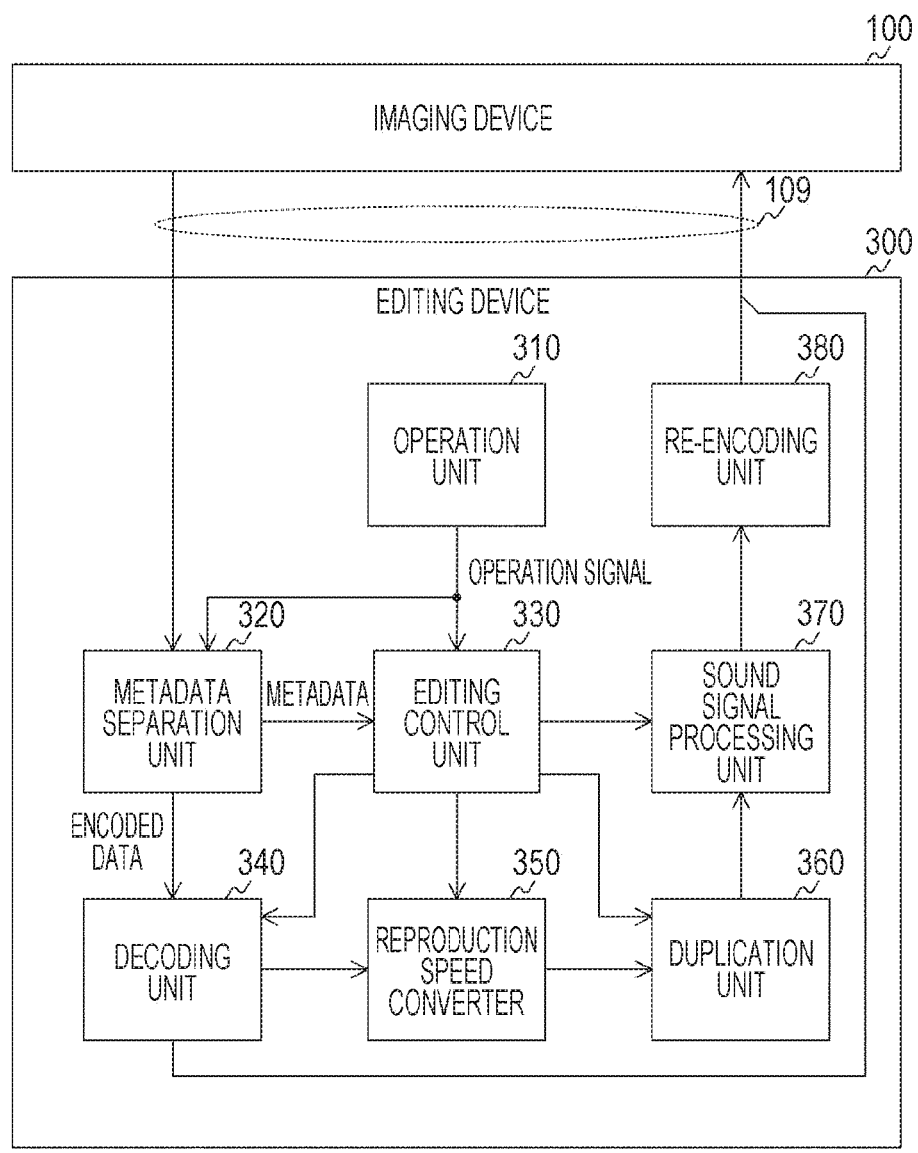
FIG. 24 is a block diagram illustrating a configuration example of an imaging system according to a third embodiment.

FIG. 24 is a block diagram illustrating a configuration example of an imaging system according to the third embodiment. The imaging system according to the third embodiment is different from the second embodiment in that an editing device 300 is provided instead of the reproduction device 200.

Furthermore, the imaging device 100 according to the third embodiment is different from the second embodiment in that in addition to the number of times of duplication and the gain change amount, a scale factor for delaying the reproduction speed is further set to metadata.

The editing device 300 includes an operation unit 310, a metadata separation unit 320, an editing control unit 330, a decoding unit 340, a reproduction speed converter 350, a duplication unit 360, a sound signal processing unit 370, and a re-encoding unit 380.

The operation unit 310 generates an operation signal according to a user's operation. For example, an operation signal instructing change of at least one of the number of times of duplication in the metadata, the gain change amount, and the scale factor is generated. The operation unit 310 supplies the generated operation signal to the editing control unit 330.

The metadata separation unit 320 separates the stream into metadata and encoded data. The metadata separation unit 320 supplies the separated metadata to the editing control unit 330 and supplies the encoded data to the decoding unit 340.

The editing control unit 330 changes at least one of the scale factor, the number of times of duplication, and the gain change amount according to the operation signal. When one of the number of times of duplication and the scale factor is changed by the user, the editing control unit 330 changes the other so as to satisfy the equation 3. The editing control unit 330 supplies the sound reproduction time of the duplication target to the decoding unit 340. In addition, the editing control unit 330 supplies the changed scale factor to the reproduction speed converter 350, supplies the number of times of duplication to the duplication unit 360, and supplies the gain change amount to the sound signal processing unit 370.

The decoding unit 340 decodes the encoded data. The decoding unit 340 decodes the sound signal to be duplicated and supplies the sound signal to the reproduction speed converter 350. A sound signal and video signal which are not to be duplicated are supplied to the imaging device 100 without being decoded.

The reproduction speed converter 350 delays the reproduction speed of the sound signal from the decoding unit 340 under the control of the editing control unit 330. The reproduction speed converter 350 supplies the sound signal having the delayed reproduction speed to the duplication unit 360. The duplication unit 360 duplicates the original sound signal under the control of the editing control unit 330. The duplication unit 360 duplicates the original sound signal and supplies the original sound signal to the sound signal processing unit 370.

The sound signal processing unit 370 executes signal processing on the duplicated sound signal under the control of the editing control unit 330. The sound signal processing unit 370 adjusts the volume level of the duplicated sound signal on the basis of the set gain change amount and supplies the duplicated sound signal to the re-encoding unit 380.

The re-encoding unit 380 re-encodes the sound signal. The re-encoding unit 380 supplies the stream generated by encoding to the imaging device 100.

In this manner, the user can further improve the reproduction quality by finely adjusting the reproduction speed and the number of times of duplication. For example, in a case where a user feels that the current reproduction speed is too slow with respect to the setting in which the reproduction speed is set to "½" times and duplication is performed "5" times, the scale factor is changed to "1" time or the like. When the scale factor is changed to "1" time, the editing device 300 changes the number of times of duplication to "10" times using the equation 3.

Note that in the third embodiment, the imaging device 100 further describes in the metadata the threshold value and the change amount of the center frequency in the equalizer processing, and the editing device 300 may change the threshold value and the change amount. Further, in the third embodiment, the imaging device 100 may further describe the offset time in the metadata, and the editing device 300 may change the offset time.

Further, although the editing device 300 is provided outside the imaging device 100, the function of the editing device 300 may be provided in the imaging device 100.

Figure 25:
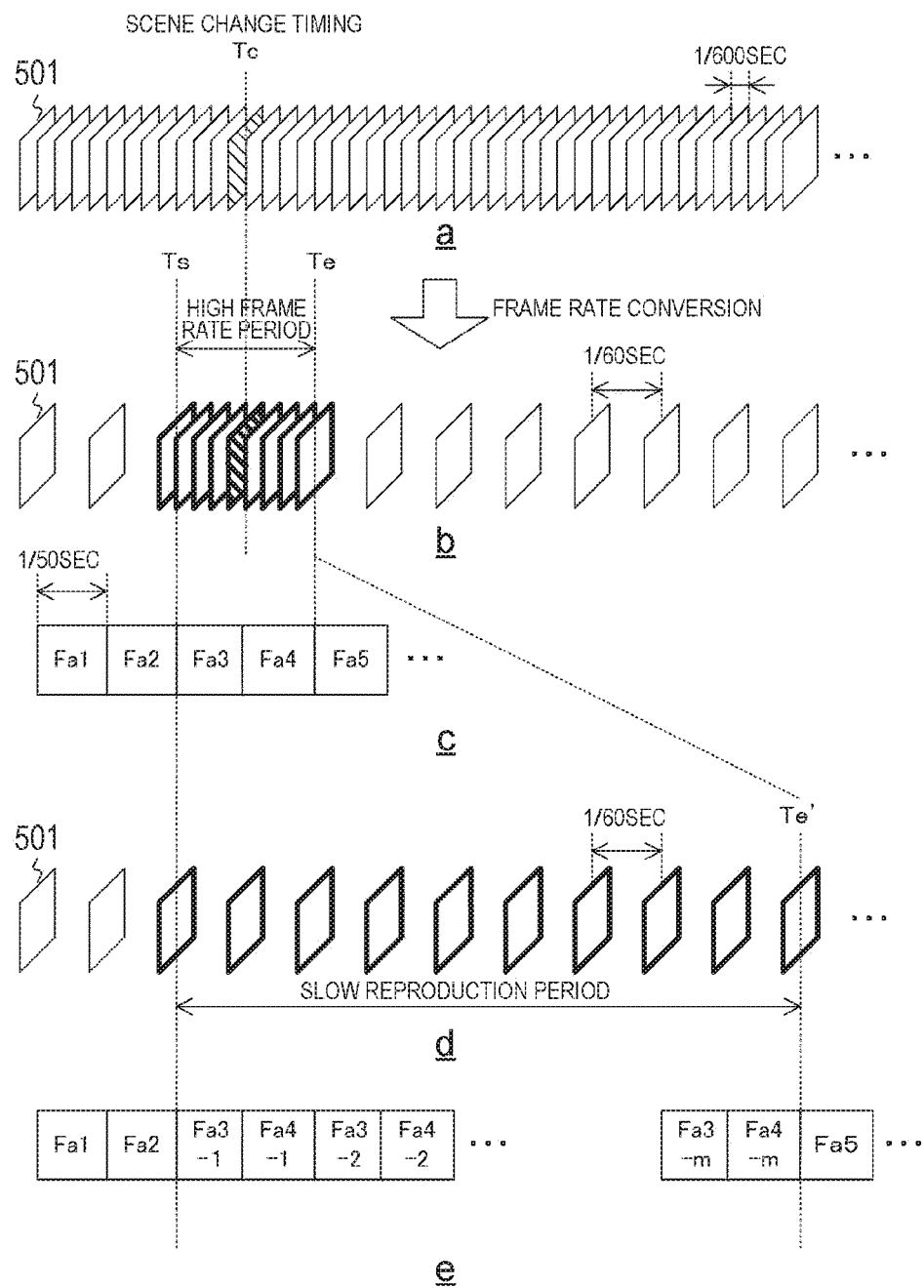
FIG. 25 is a view illustrating an example of a stream in the third embodiment.

FIG. 25 is a view illustrating an example of a stream in the third embodiment. In FIG. 25, a is an example of a video frame captured in synchronization with the vertical synchronization signal SYNC_VH. In FIG. 25, b is an example of a frame after frame rate conversion. In FIG. 25, c is an example of an encoded audio frame. In FIG. 25, d illustrates an example of a video frame in which a video reproduction time is set. In FIG. 25, e is an example of an audio frame after changing metadata. As exemplified by e in FIG. 25, the sound signal obtained by decoding audio frames Fa3 and Fa4 within the high frame rate period are duplicated to m sound signals, and the audio frames Fa 3-1 and Fa 4-1 and the like are generated by re-encoding these sound signals.

FIG. 26 is a flowchart illustrating an example of editing processing in the third embodiment. This editing processing is started, for example, when an application for editing metadata is executed.

The editing device 300 separates the metadata and changes the number of times of duplication in the metadata, the scale factor, and the gain change amount according to the user's operation (step S971). In addition, the editing device 300 executes decoding processing for decoding the encoded data (step S972), and changes the reproduction speed of the sound signal to be duplicated (step S973). Then, the editing device 300 duplicates the sound signal whose reproduction speed has been changed (step S974), and adjusts the volume level of each of the duplicated sound signals by different gains (step S975). The editing device 300 re-encodes the duplicated sound signal (step S976), and determines whether or not an operation for ending the editing has been performed (step S977). In a case where the operation for ending the recording is not performed (step S977: No), the imaging device 100 repeats the steps after step S971. On the other hand, in a case where the operation for ending the editing is performed (step S977: Yes), the imaging device 100 ends the editing processing.

As described above, according to the third embodiment of the present technology, since the duplication changes settings such as the number of times of reproduction and the reproduction speed in the metadata according to the operation of the user, it is possible to further improve the reproduction quality by finely adjusting the number of times of reproduction and the reproduction speed.

It is to be noted that the above embodiment shows an example for embodying the present technology, and matters in the embodiment and invention specifying matters in the claims have correspondence relationships, respectively. Likewise, the invention specifying matters in the claims and the matters in the embodiment of the present technology denoted by the same names have correspondence relationships. However, the present technology is not limited to the embodiment, and can be embodied by subjecting the embodiment to various modifications without departing from the gist thereof.

In addition, the processing procedure described in the above embodiment may be regarded as a method having these series of procedures, or can be regarded as a program for causing a computer to execute these series of procedures or as a recording medium for storing the program. As this recording medium, for example, a compact disk (CD), a mini disc (MD), a digital versatile disc (DVD), a memory card, a Blu-Ray™ Disc, and the like can be used.

Note that the effects described herein are not necessarily limited, and any of the effects described in the present disclosure may be applied.

It should be noted that the present technology can have the following configuration.

(1) A signal processing device including:
a frame rate converter that converts a frame rate of a frame captured outside a predetermined period among a plurality of frames captured at a predetermined frame rate to a low frame rate lower than the predetermined frame rate;
a duplication unit that duplicates an original sound signal recorded over the predetermined period to generate a plurality of duplicated sound signals each of which is identical to the original sound signal; and
a sound signal processing unit that executes different signal processing for each of the plurality of duplicated sound signals.

(2) The signal processing device according to (1), in which the sound signal processing unit performs processing of adjusting a volume level of each of the plurality of duplicated sound signals by mutually different gains, as the signal processing.

(3) The signal processing device according to (1) or (2), in which the sound signal processing unit performs processing of changing a frequency characteristic of each of the plurality of duplicated sound signals to mutually different characteristics, as the signal processing.

(4) The signal processing device according to any one of (1) to (3), further including a reproduction speed converter that changes the reproduction speed of the original sound signal and supplies the original sound signal to the duplication unit.

(5) The signal processing device according to any one of (1) to (4) further including a reproduction time setting unit that sets a start timing of a silent period to a reproduction start time of the plurality of duplicated sound signals in a case where there is a silent period in which the volume level is less than a predetermined level immediately before a start timing of the predetermined period.

(6) The signal processing device according to any one of (1) to (5), in which in a case where there is a silent period in which a volume level is less than a predetermined level immediately after a start timing of the predetermined period, the sound signal recorded over a period excluding the silent period from the predetermined period is duplicated, and in a case where there is no silent period, the original sound signal recorded over the predetermined period is duplicated.

(7) The signal processing device according to any one of (1) to (6), further including a scene change detector that detects a scene change timing at which a scene has changed from a plurality of frames captured at a predetermined frame rate and sets a period including the scene change timing as the predetermined period.

(8) A signal processing system including:
a signal processing device that converts a frame rate of a frame captured outside a predetermined period among a plurality of frames captured at a predetermined frame rate to a low frame rate lower than the predetermined frame rate, and generates metadata including setting information indicating the number of times of duplication for duplicating an original sound signal recorded over the predetermined period and mutually different signal processing to be executed for each of the plurality of duplicated sound signals generated by duplicating the original sound signal; and a reproduction device that generates the plurality of duplicated sound signals by duplicating the original sound signal on the basis of the number of times of duplication indicated by the setting information, performs the signal processing indicated by the setting information on each of the plurality of duplicated sound signals, and reproduces the plurality of sound signals and the plurality of frames.

(9) The signal processing system according to (8), in which the metadata format is MPEG4-AAC, and the signal processing device records the setting information in a data stream element (DSE) region of the metadata.

(10) The signal processing system according to (8), in which the metadata format is MPEG4-system, and the signal processing device records the setting information in a ubta region of the metadata.

(11) The signal processing system according to (8), in which the metadata format is a home and mobile multimedia platform (HMMP), and the signal processing device records the setting information in a uuid region of the metadata.

(12) A signal processing system including:

a signal processing device that converts a frame rate of a frame captured outside a predetermined period among a plurality of frames captured at a predetermined frame rate to a low frame rate lower than the predetermined frame rate, and generates metadata including setting information indicating the number of times of duplication for duplicating an original sound signal recorded over the predetermined period and mutually different signal processing to be executed for each of the plurality of duplicated sound signals generated by duplicating the original sound signal; and an editing device that changes the setting information, generates the plurality of duplicated sound signals by duplicating the original sound signal on the basis of the number of times of duplication indicated by the changed setting information, and performs the signal processing indicated by the setting information on each of the plurality of duplicated sound signals.

(13) A signal processing method including:

a frame rate conversion procedure in which a frame rate converter converts a frame rate of a frame captured outside a predetermined period among a plurality of frames captured at a predetermined frame rate to a low frame rate lower than the predetermined frame rate;

a duplication procedure in which a duplication unit duplicates an original sound signal recorded over the predetermined period to generate a plurality of duplicated sound signals each of which is identical to the original sound signal; and a sound signal processing procedure in which a sound signal processing unit executes different signal processing for each of the plurality of duplicated sound signals.

(14) A program for causing a computer to execute:

a frame rate conversion procedure of converting a frame rate of a frame captured outside a predetermined period among a plurality of frames captured at a predetermined frame rate to a low frame rate lower than the predetermined frame rate;

a duplication procedure of duplicating an original sound signal recorded over the predetermined period to generate a plurality of duplicated sound signals each of which is identical to the original sound signal; and a sound signal processing procedure of executing different signal processing for each of the plurality of duplicated sound signals.

REFERENCE SIGNS LIST

100 Imaging device
110, 210, 310 Operation unit
120 Control unit
121 Video reproduction time setting unit
122 Metadata generation unit
123 Sound reproduction time setting unit
124 Signal processing setting unit
125 Offset setting unit
126 Duplication period setting unit
130 Moving image data generation unit
131 Imaging unit
132, 171 Buffer
133 Scene change detector
134 Frame rate converter
135, 172 Switching unit
140 Moving image encoding unit
150 Stream generation unit
160 Sound sampling processing unit
170 Sound processing unit
173, 350 Reproduction speed converter
174, 250, 360 Duplication unit
175, 260, 370 Sound signal processing unit
176 Gain adjustment unit
177 Equalizer processing unit
178 Sound encoding unit
180 Recording unit
200 Reproduction device
220, 320 Metadata separation unit
230 Reproduction control unit
240, 340 Decoding unit
270 Display unit
280 Speaker
300 Editing device
330 Editing control unit
380 Re-encoding unit

The invention claimed is:

1. A signal processing device comprising:
a frame rate converter that converts a frame rate of a plurality of frames captured at a predetermined frame rate over a first predetermined period to a low frame rate that is lower than the predetermined frame rate, the plurality of frames at the low frame rate being configured for reproduction over a second predetermined period that is longer than the first predetermined period;
a duplication unit that duplicates an original sound signal recorded over the first predetermined period in association with the plurality of frames captured at the predetermined frame rate, to generate a plurality of duplicated sound signals each of which is identical to the original sound signal, the plurality of duplicated sound signals being generated for accompanying reproduction of the plurality of frames at the low frame rate; and
a sound signal processing unit that executes different signal processing for each of the plurality of duplicated sound signals for the reproduction of the plurality of frames at the low frame rate.

2. The signal processing device according to claim 1, wherein the sound signal processing unit performs processing of adjusting a volume level of each of the plurality of duplicated sound signals by mutually different gains, as the signal processing.

3. The signal processing device according to claim 1, wherein the sound signal processing unit performs processing of changing a frequency characteristic of each of the plurality of duplicated sound signals to mutually different characteristics, as the signal processing.

4. The signal processing device according to claim 1, further comprising a reproduction speed converter that changes the reproduction speed of the original sound signal and supplies the original sound signal to the duplication unit.

5. The signal processing device according to claim 1 further comprising a reproduction time setting unit that sets a start timing of a silent period to a reproduction start time of the plurality of duplicated sound signals in a case where there is a silent period in which the volume level is less than a predetermined level immediately before a start timing of the first predetermined period.

6. The signal processing device according to claim 1, in which in a case where there is a silent period in which a volume level is less than a predetermined level immediately after a start timing of the first predetermined period, the sound signal recorded over a period excluding the silent period from the first predetermined period is duplicated, and in a case where there is no silent period, the original sound signal recorded over the first predetermined period is duplicated.

7. The signal processing device according to claim 1, further comprising a scene change detector that detects a scene change timing at which a scene has changed from a plurality of frames captured at the predetermined frame rate and sets a period including the scene change timing as the first predetermined period.

8. A signal processing system comprising:
a signal processing device that converts a frame rate of a plurality of frames captured at a predetermined frame rate over a first predetermined period to a low frame rate that is lower than the predetermined frame rate, and generates metadata including setting information indicating the number of times of duplication for duplicating an original sound signal recorded over the first predetermined period and mutually different signal processing to be executed for each of the plurality of duplicated sound signals generated by duplicating the original sound signal; and
a reproduction device that generates the plurality of duplicated sound signals by duplicating the original sound signal on the basis of the number of times of duplication indicated by the setting information, performs the signal processing indicated by the setting information on each of the plurality of duplicated sound signals, and reproduces the plurality of sound signals and the plurality of frames at the low frame rate over a second predetermined period that is longer than the first predetermined period.

9. The signal processing system according to claim 8, wherein the metadata format is MPEG4-AAC, and the signal processing device records the setting information in a data stream element (DSE) region of the metadata.

10. The signal processing system according to claim 8, wherein the metadata format is MPEG4-system, and the signal processing device records the setting information in a user data region of the metadata.

11. The signal processing system according to claim 8, wherein the metadata format is a home and mobile multimedia platform (HMMP), and the signal processing device records the setting information in a uuid region of the metadata.

12. A signal processing system comprising:
a signal processing device that converts a frame rate of a plurality of frames captured at a predetermined frame rate over a first predetermined period to a low frame rate that is lower than the predetermined frame rate, and generates metadata including setting information indicating the number of times of duplication for duplicating an original sound signal recorded over the first predetermined period and mutually different signal processing to be executed for each of the plurality of duplicated sound signals generated by duplicating the original sound signal; and
an editing device that changes the setting information, generates the plurality of duplicated sound signals by duplicating the original sound signal on the basis of the number of times of duplication indicated by the changed setting information, and performs the signal processing indicated by the setting information on each of the plurality of duplicated sound signals for reproduction of the plurality of frames at the low frame rate over a second predetermined period that is longer than the first predetermined period.

13. A signal processing method comprising:
converting a frame rate of a plurality of frames captured at a predetermined frame rate over a first predetermined period to a low frame rate that is lower than the predetermined frame rate, the plurality of frames at the low frame rate being configured for reproduction over a second predetermined period that is longer than the first predetermined period;
duplicating an original sound signal recorded over the first predetermined period in association with the plurality of frames captured at the predetermined frame rate, to generate a plurality of duplicated sound signals each of which is identical to the original sound signal, the plurality of duplicated sound signals being generated for accompanying reproduction of the plurality of frames at the low frame rate; and
executing different signal processing for each of the plurality of duplicated sound signals for the reproduction of the plurality of frames at the low frame rate.

14. A non-transitory computer readable medium storing a program for signal processing, the program being executable by a computer to perform operations comprising:
converting a frame rate of a plurality of frames captured at a predetermined frame rate over a first predetermined period to a low frame rate that is lower than the predetermined frame rate, the plurality of frames at the low frame rate being configured for reproduction over a second predetermined period that is longer than the first predetermined period;
duplicating an original sound signal recorded over the first predetermined period in association with the plurality of frames captured at the predetermined frame rate, to generate a plurality of duplicated sound signals each of which is identical to the original sound signal, the plurality of duplicated sound signals being generated for accompanying reproduction of the plurality of frames at the low frame rate; and
executing different signal processing for each of the plurality of duplicated sound signals for the reproduction of the plurality of frames at the low frame rate.

* * * * *